US011636408B2

(12) United States Patent
Sit et al.

(10) Patent No.: US 11,636,408 B2
(45) Date of Patent: Apr. 25, 2023

(54) TECHNIQUES FOR MANIPULATING AND REARRANGING PRESENTATION OF WORKFORCE DATA IN ACCORDANCE WITH DIFFERENT DATA-PREDICTION SCENARIOS AVAILABLE WITHIN A GRAPHICAL USER INTERFACE (GUI) OF A COMPUTER SYSTEM, AND AN APPARATUS AND HARDWARE MEMORY IMPLEMENTING THE TECHNIQUES

(71) Applicant: Visier Solutions, Inc., Vancouver (CA)

(72) Inventors: Chuen Yan Sit, Vancouver (CA); Ronald Chi Man Leung, Vancouver (CA); Chunqing Hong, Vancouver (CA); Ju Wu, Coquitlam (CA)

(73) Assignee: VISIER SOLUTIONS, INC., Vancouver (CA)

( * ) Notice: Subject to any disclaimer, the term of this patent is extended or adjusted under 35 U.S.C. 154(b) by 0 days.

(21) Appl. No.: 14/603,120

(22) Filed: Jan. 22, 2015

(65) Prior Publication Data

US 2016/0217400 A1 Jul. 28, 2016

(51) Int. Cl.
*G06Q 30/06* (2012.01)
*G06Q 10/0631* (2023.01)

(52) U.S. Cl.
CPC .............................. *G06Q 10/06311* (2013.01)

(58) Field of Classification Search
CPC ........... G06Q 10/06311; G06Q 10/063; G06Q 10/0631; G06Q 10/063118; G06Q 10/06316
See application file for complete search history.

(56) References Cited

U.S. PATENT DOCUMENTS 5,918,232 A * 6/1999 Pouschine ......... G06F 17/30592
6,151,604 A 11/2000 Wlaschin et al.
(Continued)

FOREIGN PATENT DOCUMENTS

AU 2009202215 A1 * 12/2009 ............. G06Q 10/06

OTHER PUBLICATIONS

"Human Resources Support," Field Manual (FM) 1-0, Headquarters, Department of the Army, Apr. 2010, Appendix C, pp. C-1 to C-5.*

(Continued)

*Primary Examiner* — Patricia H Munson
*Assistant Examiner* — Marjorie Pujols-Cruz
(74) *Attorney, Agent, or Firm* — Morgan, Lewis & Bockius LLP

(57) ABSTRACT

A method includes receiving input identifying a dimensional framework and forecasting time period. The method also includes generating a workforce plan based on the dimensional framework and the forecasting time period. The method further includes receiving first data defining a first scenario of the workforce plan, where the first scenario is associated with at least a first turnover assumption, and determining a first set of forecasted headcount values corresponding to the first scenario. The method includes receiving second data defining a second scenario of the workforce plan, where the second scenario is associated with at least a second turnover assumption that differs from the first turnover assumption, and determining a second set of forecasted headcount values corresponding to the second scenario. The method includes generating graphical user interface (GUI) data that includes a comparison of the first set of forecasted headcount values and the second set of forecasted headcount values.

20 Claims, 42 Drawing Sheets

(56) References Cited

U.S. PATENT DOCUMENTS

| | | | |
|---|---|---|---|
| 6,732,079 B1 | 5/2004 | Kintner et al. | |
| 6,757,867 B2 | 6/2004 | Bauchot et al. | |
| 6,791,585 B1 | 9/2004 | Brecher et al. | |
| 7,007,020 B1 | 2/2006 | Chen et al. | |
| 7,752,070 B2* | 7/2010 | Hatcher | G06Q 10/063 705/7.38 |
| 7,805,382 B2 | 9/2010 | Rosen et al. | |
| 7,962,358 B1* | 6/2011 | Fernandez et al. | 705/7.23 |
| 8,015,042 B2* | 9/2011 | Seetharaman | G06Q 10/0631 705/7.12 |
| 8,015,043 B2* | 9/2011 | Cao et al. | 705/7.12 |
| 8,078,486 B1* | 12/2011 | McLean | G06Q 10/063 705/7.13 |
| 8,386,300 B2 | 2/2013 | April et al. | |
| 8,566,206 B2 | 10/2013 | Stolerman et al. | |
| 8,595,154 B2 | 11/2013 | Breckenridge et al. | |
| 8,744,933 B2 | 6/2014 | Shortridge | |
| 8,849,685 B2* | 9/2014 | Oden | G06Q 10/063 705/7.11 |
| 9,760,860 B2 | 9/2017 | Thompson et al. | |
| 2002/0042786 A1* | 4/2002 | Scarborough | G06Q 10/063 706/21 |
| 2002/0062240 A1* | 5/2002 | Morinville | G06F 21/604 707/792 |
| 2002/0143599 A1* | 10/2002 | Nourbakhsh | G06Q 10/06 705/7.31 |
| 2003/0229529 A1* | 12/2003 | Mui et al. | 705/8 |
| 2004/0138934 A1 | 7/2004 | Johnson et al. | |
| 2004/0143470 A1* | 7/2004 | Myrick | G06Q 30/0205 705/7.36 |
| 2004/0162748 A1 | 8/2004 | Vogel et al. | |
| 2005/0049911 A1 | 3/2005 | Engelking et al. | |
| 2005/0065837 A1* | 3/2005 | Kosiba et al. | 705/9 |
| 2005/0080802 A1 | 4/2005 | Cras et al. | |
| 2005/0165930 A1* | 7/2005 | Whitman, Jr. | 709/226 |
| 2006/0085444 A1* | 4/2006 | Sarawgi | G06F 16/283 |
| 2006/0235737 A1* | 10/2006 | Fleurant | G06Q 10/0631 6 705/7.26 |
| 2006/0235738 A1* | 10/2006 | Doyle | G06Q 10/0631 1 705/7.15 |
| 2007/0021999 A1 | 1/2007 | Whalen et al. | |
| 2007/0033060 A1* | 2/2007 | Gopalan | G06Q 10/0631 705/7.12 |
| 2007/0038505 A1* | 2/2007 | Barnes, IV | G06Q 10/06 705/7.42 |
| 2007/0067204 A1 | 3/2007 | Brown et al. | |
| 2007/0124199 A1 | 5/2007 | Robinson et al. | |
| 2007/0136294 A1* | 6/2007 | Morinville | G06F 21/604 |
| 2007/0250417 A1* | 10/2007 | Lane et al. | 705/30 |
| 2007/0276717 A1 | 11/2007 | Alburey et al. | |
| 2008/0140688 A1* | 6/2008 | Clayton | G06Q 10/06 |
| 2008/0167929 A1* | 7/2008 | Cao | G06Q 10/06 705/7.11 |
| 2008/0167930 A1* | 7/2008 | Cao | G06Q 10/06 705/7.14 |
| 2008/0243581 A1 | 10/2008 | Jennings | |
| 2009/0019014 A1 | 1/2009 | Sugimoto | |
| 2009/0157462 A1* | 6/2009 | Morinville | G06Q 10/063 705/7.11 |
| 2009/0157463 A1* | 6/2009 | Morinville | G06Q 10/06 705/7.13 |
| 2009/0182598 A1* | 7/2009 | An | G06Q 10/04 705/7.14 |
| 2009/0254389 A1* | 10/2009 | Teal et al. | 705/7 |
| 2009/0271240 A1* | 10/2009 | Kumar et al. | 705/8 |
| 2009/0299808 A1 | 12/2009 | Gilmour et al. | |
| 2009/0307052 A1* | 12/2009 | Mankani | G06Q 10/06 705/7.17 |
| 2010/0037161 A1 | 2/2010 | Stading et al. | |
| 2010/0106566 A1* | 4/2010 | Al-Otaibi | G06Q 10/06 705/7.36 |
| 2010/0169150 A1* | 7/2010 | Gremont | G06Q 10/0631 2 705/7.14 |
| 2010/0312605 A1* | 12/2010 | Mitchell | G06Q 10/06 705/7.13 |
| 2011/0015958 A1* | 1/2011 | April | G06Q 10/06 705/321 |
| 2011/0040697 A1 | 2/2011 | Constantinou et al. | |
| 2011/0202382 A1* | 8/2011 | Santos et al. | 705/7.17 |
| 2012/0016710 A1* | 1/2012 | Santos | G06Q 10/06 705/7.22 |
| 2012/0130768 A1* | 5/2012 | Rajagopal | G06Q 10/06 705/7.25 |
| 2012/0278212 A1 | 11/2012 | Upadhyaya et al. | |
| 2013/0013369 A1* | 1/2013 | Deich | G06Q 10/06 705/7.25 |
| 2013/0013602 A1 | 1/2013 | Manner et al. | |
| 2013/0080202 A1* | 3/2013 | Cameron | G06Q 10/00 705/7.16 |
| 2013/0179244 A1* | 7/2013 | Laffoon | G06F 21/6218 705/14.23 |
| 2014/0046956 A1 | 2/2014 | Zenger et al. | |
| 2014/0278754 A1* | 9/2014 | Cronin | G06F 17/30539 705/7.29 |
| 2014/0330605 A1* | 11/2014 | Connolly | G06Q 10/0631 16 705/7.16 |
| 2014/0372161 A1* | 12/2014 | Ulrich | G06Q 10/0631 18 705/7.17 |
| 2015/0354201 A1 | 12/2015 | Gruetering | |
| 2016/0098666 A1* | 4/2016 | Hojby | G06Q 10/0631 16 705/7.14 |
| 2016/0132816 A1 | 5/2016 | Lush | |
| 2016/0180270 A1* | 6/2016 | Sun | G06Q 10/0631 3 705/7.23 |
| 2016/0352860 A1 | 12/2016 | Deb et al. | |

OTHER PUBLICATIONS

"7 Reasons to Choose Anaplan to Replace Your Planning Spreadsheets", Anaplan, 2014, 7 pages.

"Anaplan for Workday", Anaplan, 2014, 2 pages.

"Anaplan makes workforce planning strategic at a fast-growing cloud computing company", Case Study: Cloud Computing Company, Anaplan, 2013, 5 pages.

"Keep your staffing costs tightly aligned with demand using real-time planning for headcount and capacity", Anaplan Finance, Workforce Planning, anaplan.com, 2014, 2 pages.

A Supply Chain Approach to Workforce Planning | HR Performance Sites; https://hrperformancesites.wordpress.com/2009/03/09/a-supply-chain-approach-to-workforce-planning/; as retrieved on Jul. 24, 2015, 13 pages.

Workforce Planning | HRBoss; https://hrboss.com/panel/workforce-planning; as retrieved on Jul. 24, 2015, 8 pages.

"NPL Search, Google Patents, May 14, 2019".

"NPL Search, Google Scholar, May 14, 2019".

* cited by examiner

Search My Plans

John Smith ▼     *BlueCircle Enterprises*

— 201     — 202

Create New Plan

My plans

User default settings

Default settings for plan creation

Time granularity
At what time granularity do you want to set targets?
- Monthly
- Quarterly Timeline
How far into the future is the plan for?
Period count: [12] Max periods: 60

Default org attribute
Reporting ▼
Framework
Sub attribute

Default settings for plan composition

Auto expansion settings
Expand across [ ]  Expand down [ ]

Turnover Assumptions

*Evaluate and set up forecasts on future exits to make your targets and hiring requirements more accurate.*

- Resignation rate
- Involuntary turnover rate
- Retirement rate

Sarah Jones ▼     *BlueCircle Enterprises*

Search My Plans     Create New Plan

My plans ▶

▶

My tasks (plans assigned to me)

| Name | Status | Last edited | Due date | Assigned from | Assigned to |
|---|---|---|---|---|---|
| 2015 - Products | NEW | 2014-12-01 | 2014-12-15 | John Smith | Sarah Jones |

User default settings ▶

Turnover Assumptions ▶

Submit and update

This plan was started on Dec 31, 2014. It is due on Jan 15, 2015

Submit plan

The plan data of the following scenarios will be submitted for review :

- Heavy Turnover
- Seasonal Turnover

Comments?

Fit to cost limit in both scenarios

Submit

*FIG. 36*

| | | | John Smith ▼ | BlueCircle Enterprises |
|---|---|---|---|---|
| Search My Plans | | | | Create New Plan |

My plans ▼

| Name | Status | Last edited | Due date | | |
|---|---|---|---|---|---|
| 2015 - Products | SUBMITTED | 2014-12-04 | 2014-12-15 | | |

My tasks (plans assigned to me) ▼

| | | | Assigned from | Assigned to |
|---|---|---|---|---|
| | | | John Smith | Sarah Jones |

User default settings ▶

Turnover Assumptions ▼

◆ Resignation rate
  seasonal resignation rate
  2% Resignation
  ss resignation rate ◆ Involuntary turnover rate
  seasonal invol. turn. rate
  1.5% Involuntary Turnover ◆ Retirement rate
  seasonal retirement rate
  1% Retirement

TECHNIQUES FOR MANIPULATING AND REARRANGING PRESENTATION OF WORKFORCE DATA IN ACCORDANCE WITH DIFFERENT DATA-PREDICTION SCENARIOS AVAILABLE WITHIN A GRAPHICAL USER INTERFACE (GUI) OF A COMPUTER SYSTEM, AND AN APPARATUS AND HARDWARE MEMORY IMPLEMENTING THE TECHNIQUES

BACKGROUND

Use of computing devices and software is enabling advanced analytics in business areas where manual or spreadsheet-based computation were traditionally used. One example of a business area that is seeing increasing computer-based analysis is workforce management/human resources (HR). To illustrate, a business enterprise may maintain large databases to store data related to employee hiring, retention, resignation, etc. However, the data in the databases is historical data, which may not be applicable to future economic conditions. It may thus be difficult for a business enterprise to predict, model, and plan for workforce changes and contingencies that can occur in the future. Spreadsheets may also be cumbersome and error-prone, thereby limiting planning frequency, increasing the number of people involved in the planning process (e.g., the number of people that need to have access to the spreadsheet), and diminishing the quality of planning results. Moreover, the spreadsheet (and formulae hardcoded therein) may be difficult to adapt for reuse in another planning scenario.

SUMMARY

Systems and methods of workforce planning are disclosed. A workforce planning application may enable a business enterprise to model and predict characteristics of its workforce based on user-defined assumptions and scenarios. To illustrate, using the workforce planning application described herein, a user may create, experiment with, and publish plans regarding projected workforce changes that may occur in the future. The workforce planning application may offer a selection of several mathematical modeling techniques that can be used to project future workforce changes (e.g., in terms of headcount and cost) and automatically fit the plan to limits or parameters (e.g., headcount/cost) defined by the user. The workforce planning application may also enable the user to create "what if" scenarios to explore how headcount and cost (or other metrics) may change in response to specific events, such as an economic recession, a hiring freeze, a planned workforce increase, etc. Further, the user may define assumptions to be taken into account when generating and updating the plan, such as assumptions regarding employee turnover rate, cost of employee hiring, and employment costs (e.g., base pay, bonus, benefits, etc.). The output of the workforce planning application may provide a view of a hiring plan that describes a gap between a current and a desired workforce. Actual historical data may be used as a "starting point" for forecasting purposes (e.g., to determine an initial plan). Further, as time progresses, actual data may be used to determine whether to revise the initial plan (e.g., based on deviations of actual workforce data from projected workforce data).

In some examples, the workforce planning application may enable collaborative workflows. To illustrate, a HR manager may create a "parent" plan, define certain headcount/cost limits, and delegate different sub-plans of the "parent" plan to different HR employees. Each of the employees may use the workforce planning application to access their assigned sub-plan, and the workforce planning application may flag changes to the plans that violate the limits defined by the HR manager. When an employee submits their assigned sub-plan, the HR manager may use the workforce planning application to review the sub-plan, merge the sub-plan into the "parent" plan being maintained by the HR manager, or reject the sub-plan and provide feedback to the employee regarding how to correct the sub-plan.

BRIEF DESCRIPTION OF THE DRAWINGS

FIGS. 2-28 illustrate screenshots of exemplary embodiments of operation at a workforce planning application in accordance with the present disclosure;

Figure 31:
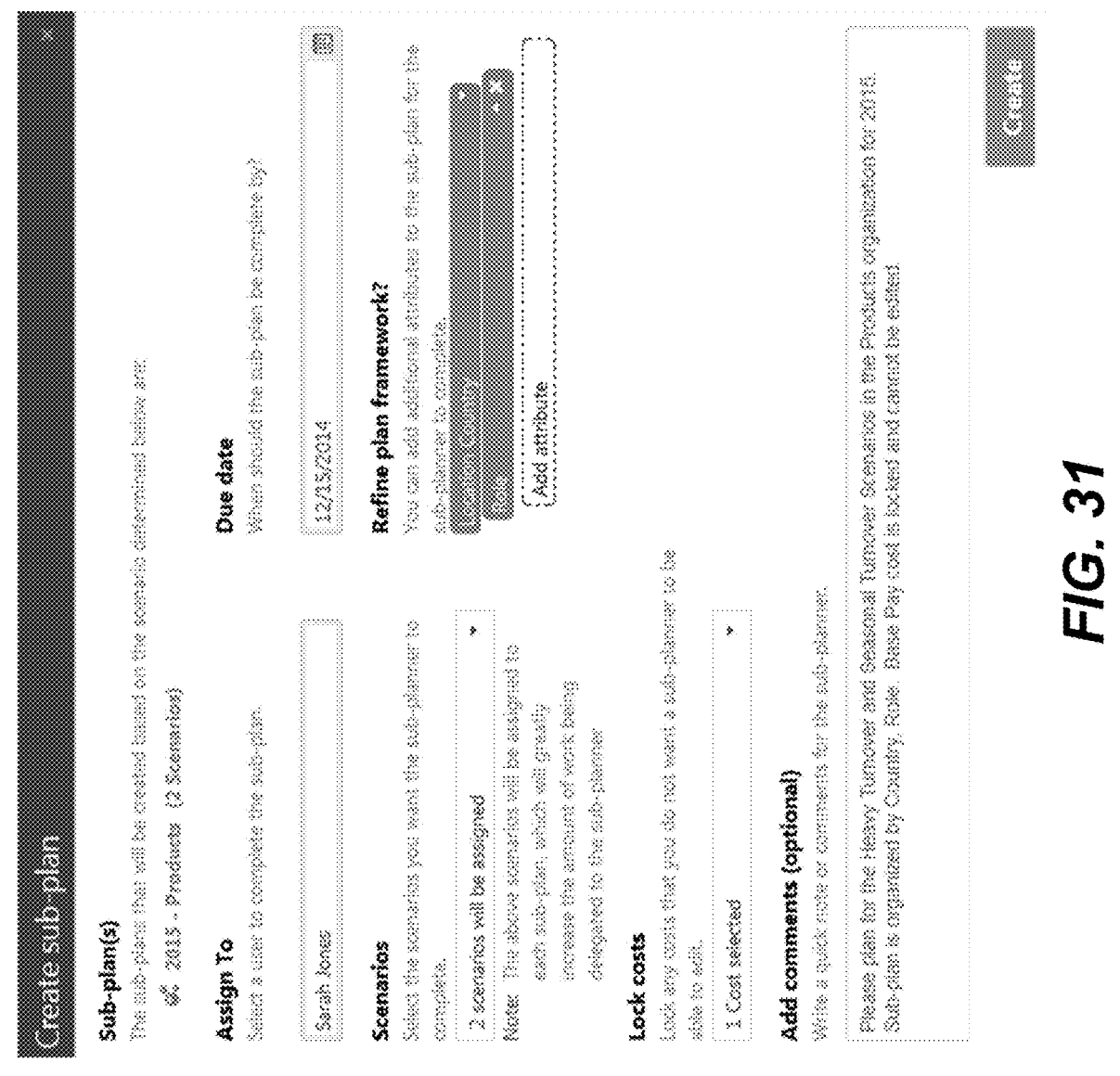

FIGS. 31-39 illustrate screenshots of exemplary embodiments of collaborative workforce planning;

DETAILED DESCRIPTION

Figure 1:
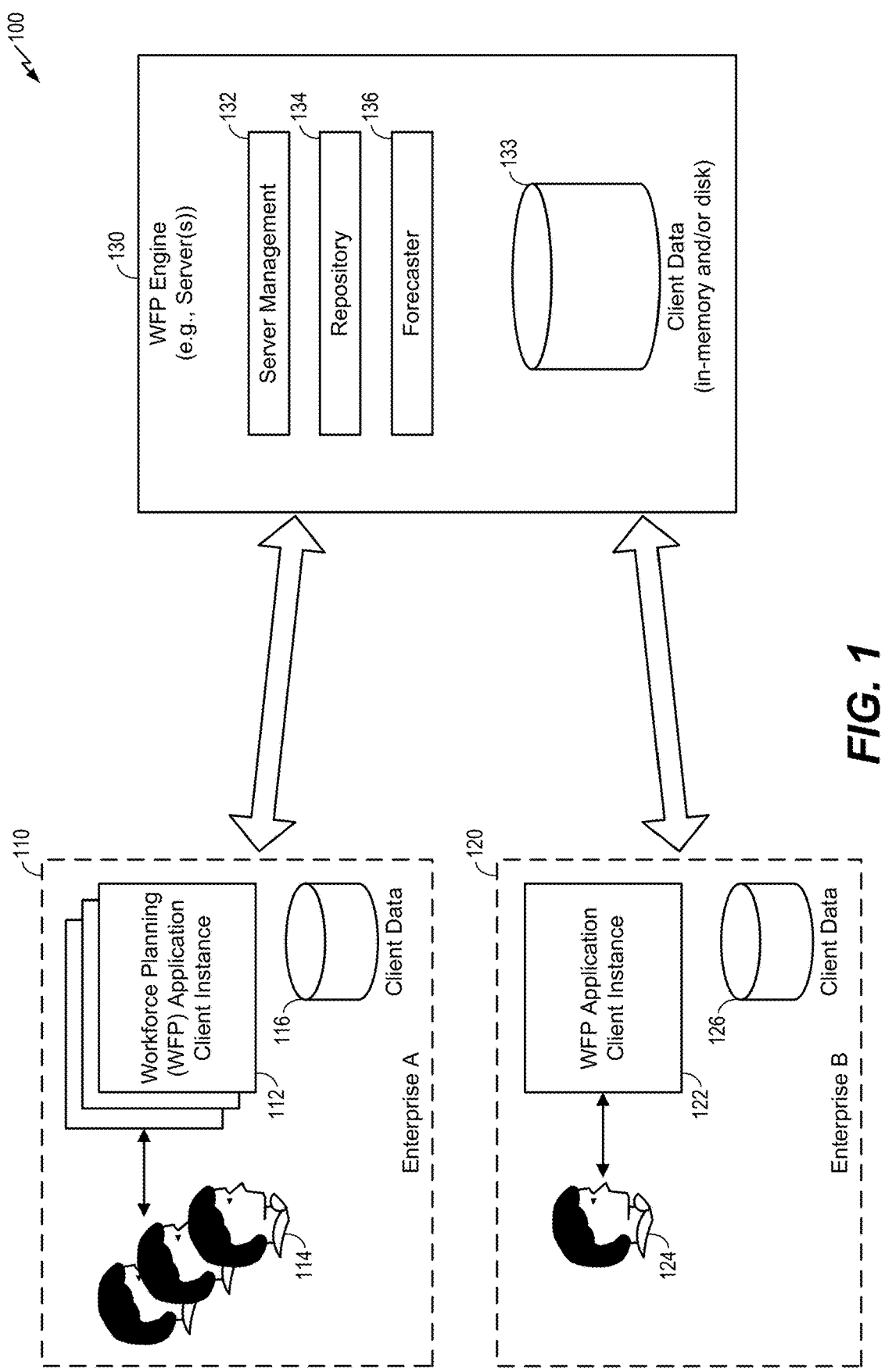
FIG. 1 illustrates a particular embodiment of a system that is operable to perform workforce planning.

Referring to FIG. 1, a particular embodiment of a system 100 that is operable to perform workforce planning (WFP) is shown. The system 100 includes a client-server platform that enables users at various business enterprises to execute a workforce planning web application. In the example of FIG. 1, two enterprises are shown: Enterprise A 110 and Enterprise B 120, although in alternative embodiments more enterprises may be supported. The client portion of the platform is illustrated in FIG. 1 by client instances 112, 122. The server portion of the platform is illustrated in FIG. 1 by a WFP engine 130.

In a particular embodiment, each of the client instances 112 may be a "thin" client application, such as an Internet-accessible web application, that presents graphical user interfaces (GUIs) based on communication with the WFP engine 130. Each of the enterprises 110, 120 may be a corporation, a partnership, a government department, an education institution, or other entity. The enterprise 110 is associated with one or more users 114 (e.g., employees) that have the ability to access the one or more client instances 112. Each of the users 114 may log in to a website or web application corresponding to a client instance 112 using a browser of a computing device, such as a desktop computer, a laptop computer, a mobile phone, a tablet computer, etc. The process of logging in identifies the user and the rights he or she may have with respect to the data that is being accessed. Similarly, a user 124 at the enterprise 120 may access the log in to a website or web application corresponding to the client instance 122. The enterprises 110, 120 may acquire access to the WFP platform via a purchase, a license, a subscription, or by another method.

Each enterprise 110, 120 may provide the WFP platform (e.g., the client instances 112, 122 and/or the WFP engine 130) access to their respective client data 116, 126. The client data 116, 126 may include historical data regarding headcount, cost, and turnover at the respective enterprises 110, 120, as illustrative non-limiting examples. In a particular embodiment, the enterprises 110, 120 upload their respective client data 116, 126 to the WFP engine 130. The uploaded data may be "cleaned" (e.g., via data integrity checks and error-correction operations), transformed, and loaded into an in-memory database at the WFP engine 130 as client data 133. As further described herein, the WFP engine 130 may use the client data 133 to generate plans regarding future employee turnover. For example, the client data 133 may include actual historical workforce data (e.g., past employee turnover) that the WFP engine 130 may use to generate a plan (e.g., an "initial" plan) regarding future employee turnover. Further, the WFP engine 130 may compare actual workforce data (e.g., actual employee turnover) to projected workforce data (e.g., predicted employee turnover based on the initial plan) during a lifecycle of the plan (e.g., to determine whether to generate a "revised" plan).

In a particular embodiment, the system 100 of FIG. 1 operates on multidimensional data. A "dimension" may refer to a semantic object or concept that represents a way of associating data with "dimension members," where the dimension members correspond to continuous or discrete points on an axis. Dimensions may be hierarchical, and there may be multiple levels for a dimension. For example, a "Location" dimension may have the members "Canada," "UK," and "US," the "US" dimension member may have members "Texas," and "California," the "Texas" dimension member may have members "Austin," "Houston," and "Dallas," etc.

In a particular embodiment, the WFP engine 130 may be configured to receive queries (e.g., processing requests) from the client instances 112, 122, execute the queries, and provide results of executing the queries to the client instances 112, 122. The queries may correspond to various WFP operations, as further described herein. In a particular embodiment, the WFP engine 130 includes a server management module 132 that is configured to manage a server environment and to provide interfaces to handle requests. For example, the server management module 132 may communicate with the client instances 112, 122. In a particular embodiment, the communication is performed via scripts, servlets, application programming interfaces (APIs) (e.g., a representational state transfer (REST) API), etc. The server management module 132 may also expose services and/or data to the client instances 112. For example, exposed services and data may include query output, session and user account management services, server administration services, etc.

The WFP engine 130 may also include a repository 134. In a particular embodiment, the repository 134 stores and/or includes software corresponding to controllers that interact with requests from client instances, services that interact with data storage, and data models used to perform WFP operations. The WFP engine 130 may further include a forecaster 136. The forecaster 136 may be configured to service requests based on models stored in the repository 134. Additional architectural details regarding the WFP platform of FIG. 1 are described with reference to FIG. 40.

Figure 5:
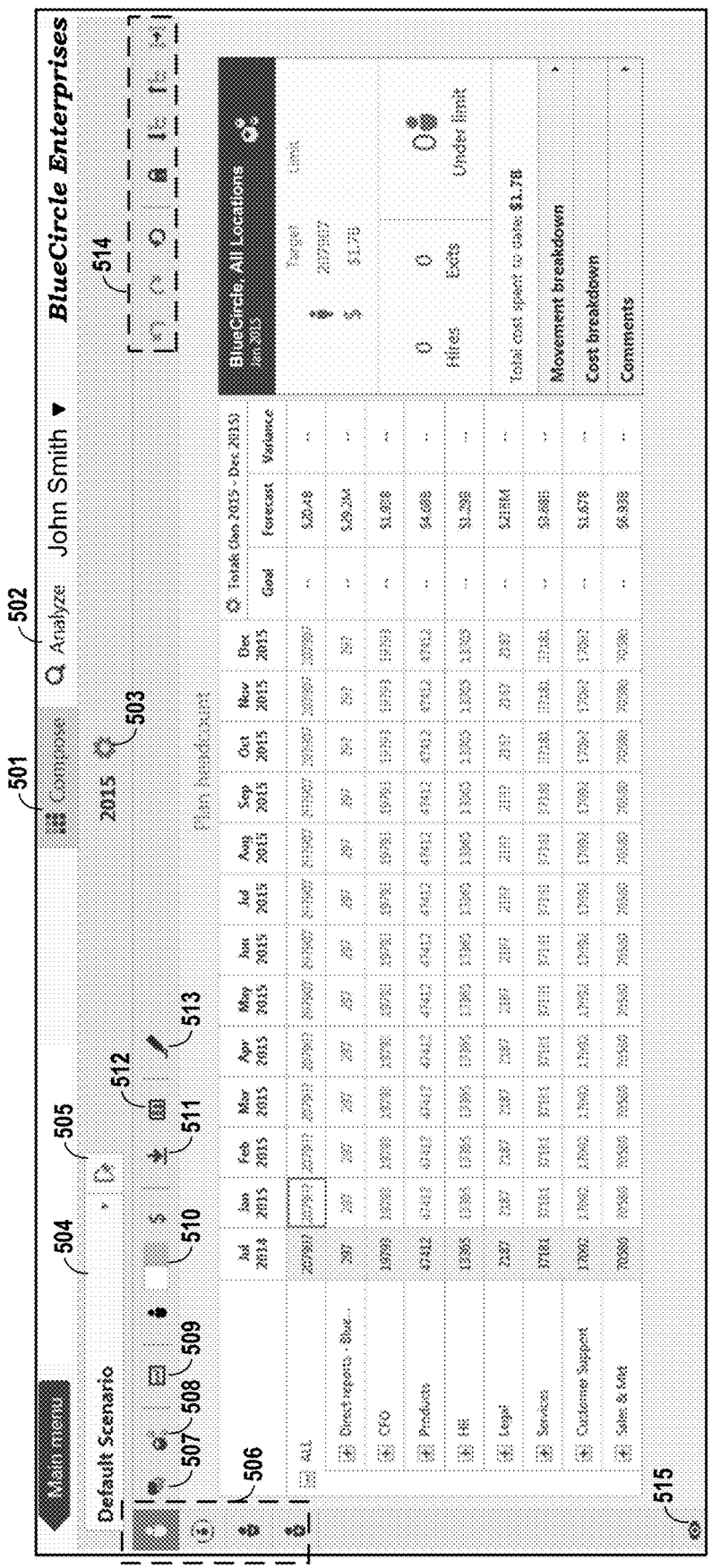

During operation, a user 114 may log in to a particular client instance 112, and the client instance 112 may display a graphical user interface (GUI) that is operable to generate a plan, generate forecasting queries for execution by the WFP engine 130, collaborate with other users on a plan, and create "what if" scenarios regarding events in the future that may impact employee turnover, as illustrative non-limiting examples. As used herein, a "plan" may include an object or entity representing a projection of a workforce headcount by dimension and time. In some examples, the plan may be viewed as a hierarchical grid, as shown in FIG. 5. During operation, the client instance 112 and the WFP engine 130 may communicate via a network, such as a local area network (LAN), a wide area network (WAN), the Internet, etc. The client instance 112 may use data received from the WFP engine 130 to generate/populate visualization(s), such as a grid or a chart.

Illustrative examples of WFP applications supported by the present disclosure are described below in conjunction with exemplary screenshots. In an illustrative embodiment, such screenshots may be generated at a WFP client instance, such as the client instance 112 or 122 of FIG. 1, based on GUI data received from a server, such as the WFP engine 130 of FIG. 1. FIG. 2 illustrates an example of a graphical user interface (GUI) displayed after a user has logged in (e.g., via username and password) to a WFP client instance. In the example of FIG. 2, the user is John Smith (as indicated at 201), who is an employee of the company BlueCircle Enterprises (as indicated at 202). The GUI of FIG. 2 includes a "user default settings" section and a "turnover assumptions" section. The user default settings section may be used to define certain default settings that are used when a new plan is created. For example, default settings for time granularity (e.g., monthly or quarterly), a timeline (e.g., periods into the future covered by the plan), a plan expansion, organizational attribute(s) (e.g., reporting organization, cost centers, profit centers, etc.), and a plan framework (e.g., a hierarchy including various dimensions, such as reporting organization/cost center/profit center level, location, employment type, managers, previous experience, role, tenure, etc.) may be defined.

The plan framework for a plan may be represented by two axes: a dimensional hierarchy axis and a time axis. In the examples described herein, such as the screenshot of FIG. 5, the dimensional hierarchy axis is the vertical axis of a planning grid and the time axis is the horizontal axis of the grid. In the plan framework, the dimensions, the order of the dimensions, and the level depth of the dimensions may determine which dimension members are available for planning. For example, in a plan with the dimensional hierarchy "Reporting: Level 1, Location: Country," the organization is divided based on level one members reporting organization dimension (e.g., Products, Legal, Services, etc.), and then further divided based on country (e.g., Canada, UK, US, etc.).

In the example of FIG. 2, the turnover assumptions include a resignation rate assumption, an involuntary turnover rate assumption, and a retirement rate assumption. Moreover, as shown in FIG. 2, such assumptions can be defined independently of a specific plan and may therefore by reused in different plans. The GUI of FIG. 2 also includes elements operable to search existing plans (in the example of FIG. 2, no plans are available for the user John Smith) and to create a new plan.

Figure 3:
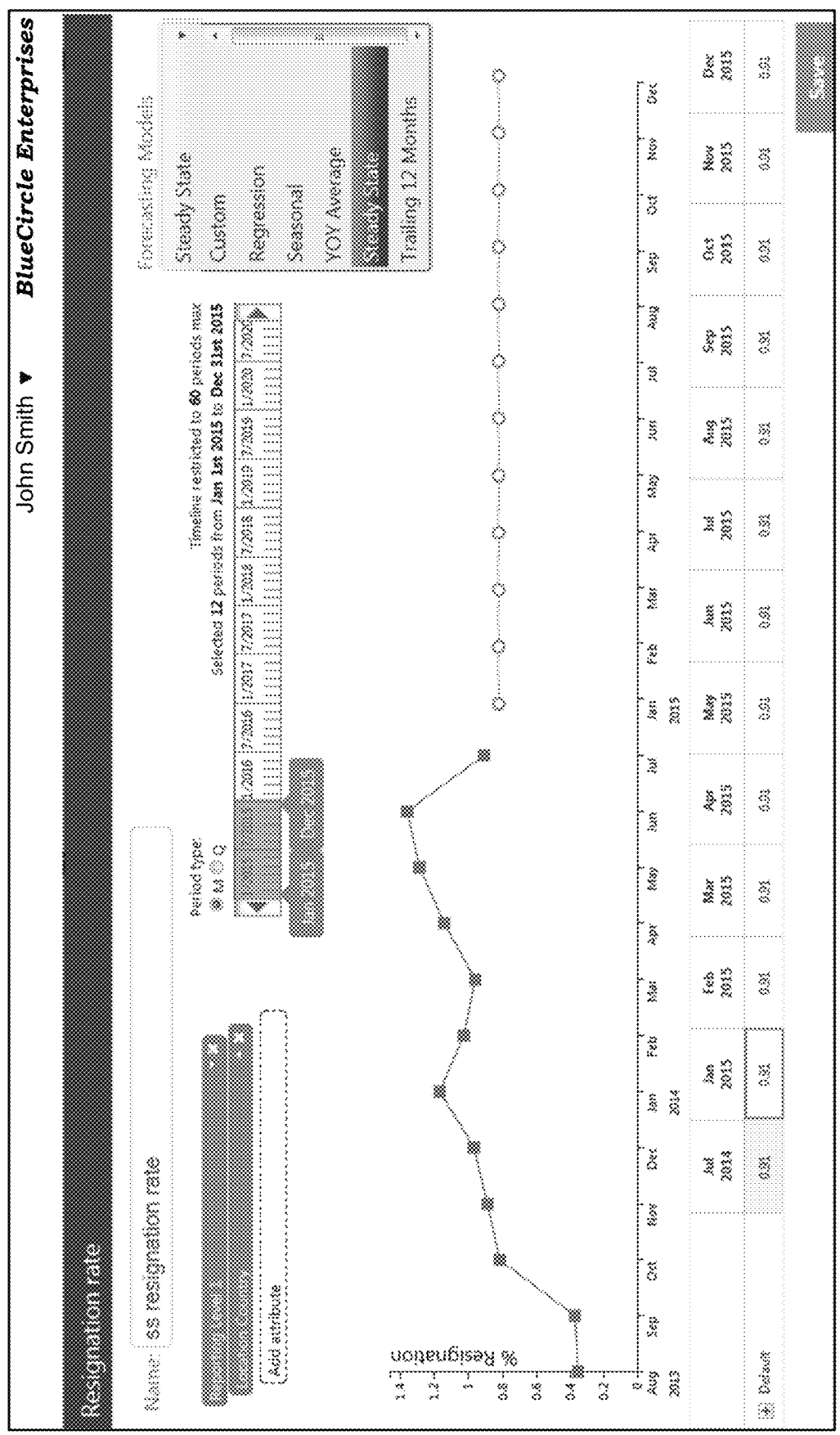

FIG. 3 illustrates an example of a GUI operable to create/edit an assumption. In the embodiment of FIG. 3, the user is creating a resignation rate assumption using a steady state forecasting model, and has named the assumption "ss resignation rate." The user has chosen level 1 reporting organization and country as the dimensional framework for the assumption. As shown in the chart of FIG. 3 via solid line, historical data for resignation rate at BlueCircle Enterprises is available from August 2013 to July 2014, and the steady state forecasting model projects the most recent resignation rate value (0.91%, from July 2014) forward for the duration of the plan. Other available forecasting models include trailing 12 months, year-on-year (YOY) average, seasonal, regression, and custom. The trailing 12 months model may use a fixed or sliding window average of values from up to the previous 12 months of historical data. The YOY average model may use an average of corresponding values of the N previous years, where N>=1. The seasonal model may use values from corresponding seasonal time periods of up to the previous 12 months of historical data. The regression model may use a best fit curve from up to the previous 12 months of historical data.

Figure 4:
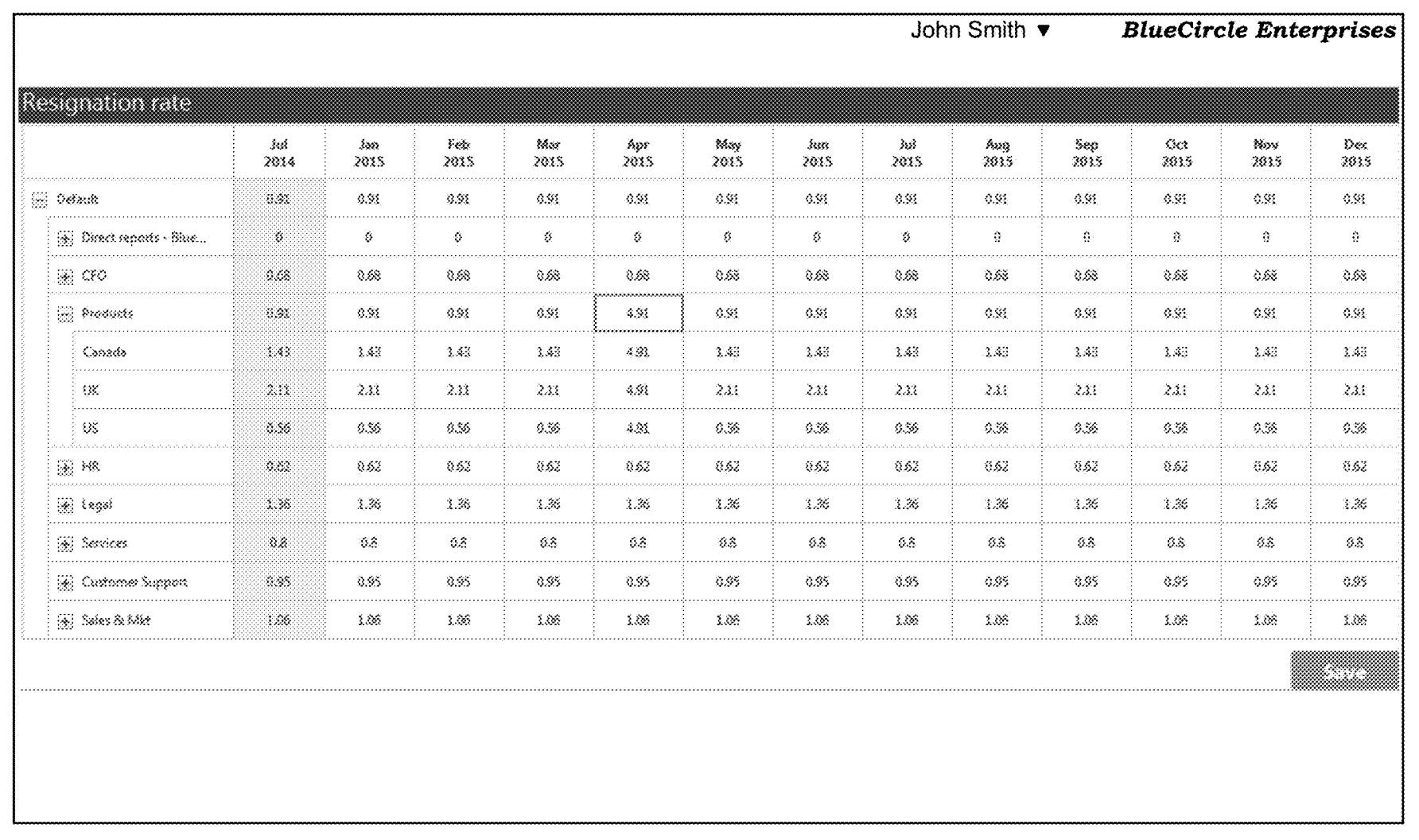

The custom forecasting model may be used by the user to manually input forecasted values. For example, as shown in FIG. 4, the user may manually enter forecasted resignation rates into the grid at the bottom of the GUI. In the embodiment of FIG. 4, the user has changed the April 2015 resignation rate in the Products organization from 0.91% to 4.91%. In response, the Canada, UK, and US resignation rates for the Products organization in April 2015 are automatically changed to 4.91% (i.e., the change has been distributed down the dimensional hierarchy).

When a user instructs the WFP application to create a new plan, the user may provide input regarding a name for the plan, a context (e.g., top-level data universe) for the plan, select a time span for the plan, define a plan framework (dimensional hierarchy), and select any specific cost models that should be applied to the plan. FIG. 5 illustrates an example of planning GUI corresponding to a plan named "2015" having a context of "BlueCircle—All Locations," a time span of January 2015 to December 2015, and a plan framework of level 1 reporting organization followed by country.

The GUI of FIG. 5 displays forecasted headcount values in a grid. It is to be noted that the forecasted headcount values in FIG. 5 are the same in each column because turnover assumptions have not yet been associated with the plan (i.e., no hiring or firings are being forecasted yet). The GUI includes a compose tab 501 (which is selected) and an analyze tab 502, which is further described with reference to FIG. 21. The GUI further includes a settings button 503 that can be used to edit the plan name, framework, time span, cost models, etc. A scenario drop-down menu 504 and a scenario edit button 505 may be used to toggle between and edit different scenarios of the plan, as further described herein. When a new plan is created, a scenario called "Default Scenario" may be created, as shown in FIG. 5.

A set of buttons 506 may be used to switch between different plan views, including viewing/entering headcounts, viewing plan historical data, viewing turnover, and viewing plan vs. actual hires. The GUI further includes a collaboration feed button 507 that is operable to view a timeline of collaboration events associated with the plan and a create sub-plan button 508 that is operable to create a sub-plan from the plan, where the sub-plan can be assigned to another user for collaborative editing. Collaborative planning is further illustrated with reference to FIGS. 26-35. A show line chart button 509 may be operable to view values from one or more cells of the grid as a line chart, and a selector 510 may be used to switch between viewing plan headcount (as shown in FIG. 5) and viewing plan cost (as shown in FIG. 6). Each cell of the grid corresponds to a headcount value that is addressed by a row position (e.g., set of dimensions) and a column position (e.g., time period).

An export button 511 may be used to export plan data to a spreadsheet, a comma-separated values (CSV) file, etc. An export employee(s) button 512 may be used to export a list of employees for an active cell context. For example, because the January 2015 cell for "ALL" is active in FIG. 5, selecting the export employee(s) button 512 may export a list of all projected BlueCircle employees in January 2015. The GUI may also include a highlight button 513, the operation of which is further described with reference to FIG. 25. A set of buttons 514 may be used to perform various editing functions, such as undo, redo, reset data, lock, expand down a column, roll up a column, and expand across a row.

In a particular embodiment, historical data in the grid is visually distinguished from forecasted data. For example, as shown in FIG. 5, cells in the July 2014 column, which corresponds to historical data, have a different background color/pattern/shading than cells in the January 2015 to December 2015 columns, which correspond to forecasted data. When the plan is created, based on the (e.g., user-defined or default) time granularity and dimensional hierarchy of the plan, the WFA application of the present disclosure may retrieve a "snapshot" or the relevant headcount, turnover, and cost data from a database or other storage device. The data for each row of the grid may be projected forwards to pre-populate a default scenario with headcount values. In a particular embodiment, plan rows that do not have non-zero historical headcount values are not projected forwards into the plan time periods. It will be appreciated that by using historical data, the WFP application may start with up-to-date organizational structures, headcounts, and costs (i.e., an accurate picture of present and past workforce). Rather than requiring manual input of starting data, such as in a spreadsheet, the WFP application of the present disclosure uses historical truths as a starting point for assumptions and to drive the forecasting. Within a plan, different scenarios may use the same assumption(s) or different assumptions. An assumptions used in a scenario of a first plan may also be reused in a scenario of a second plan (e.g., provided that the time span of the first plan is equal to or a superset of the time span of the second plan).

Figure 7:
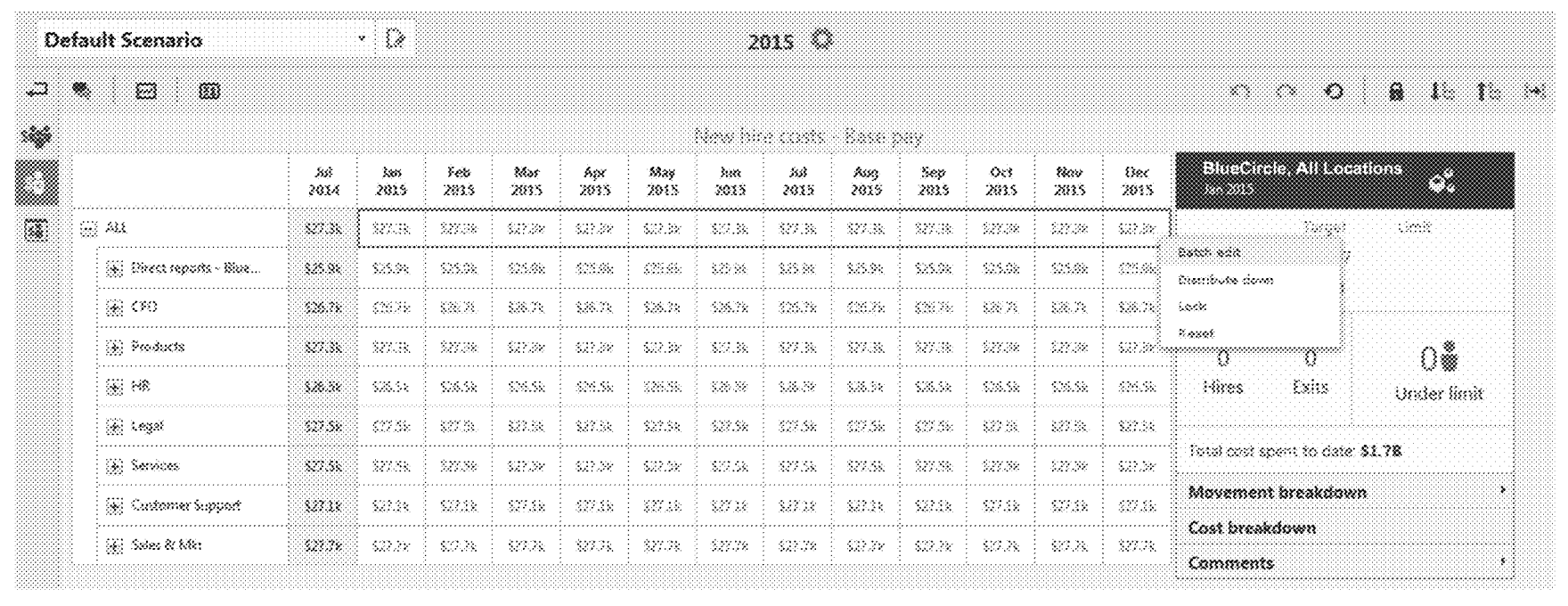
Figure 8:
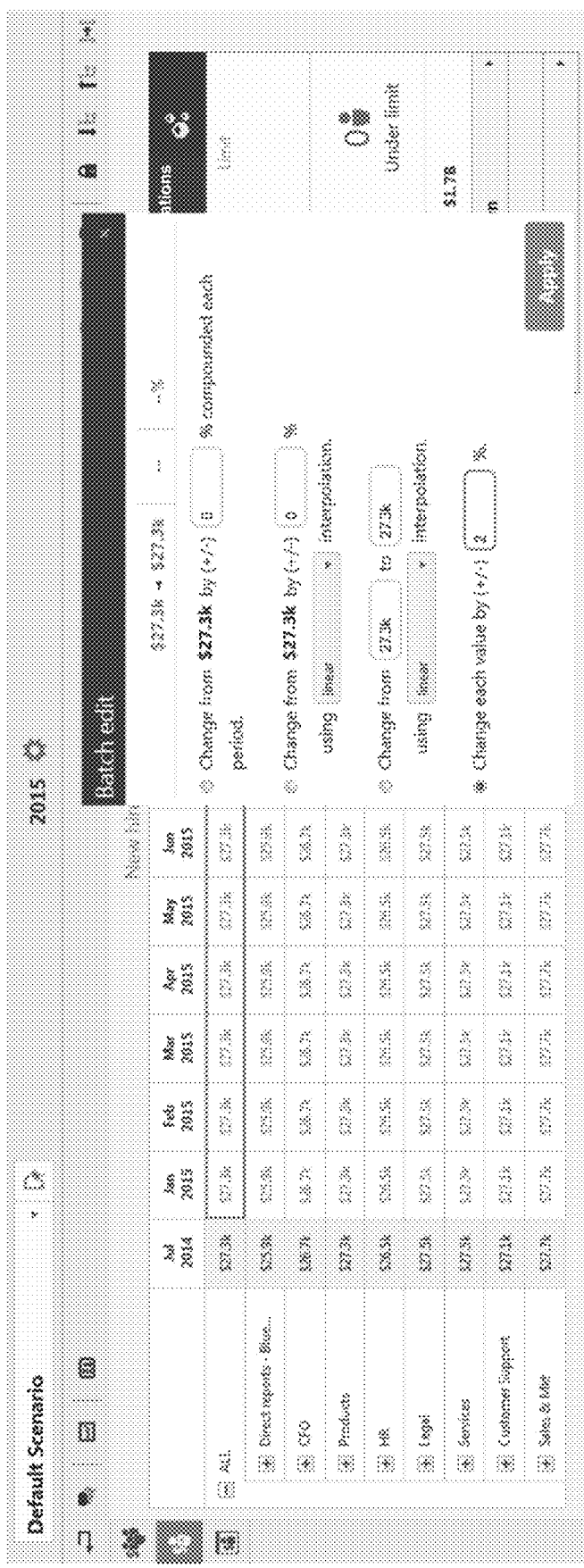
Figure 9:
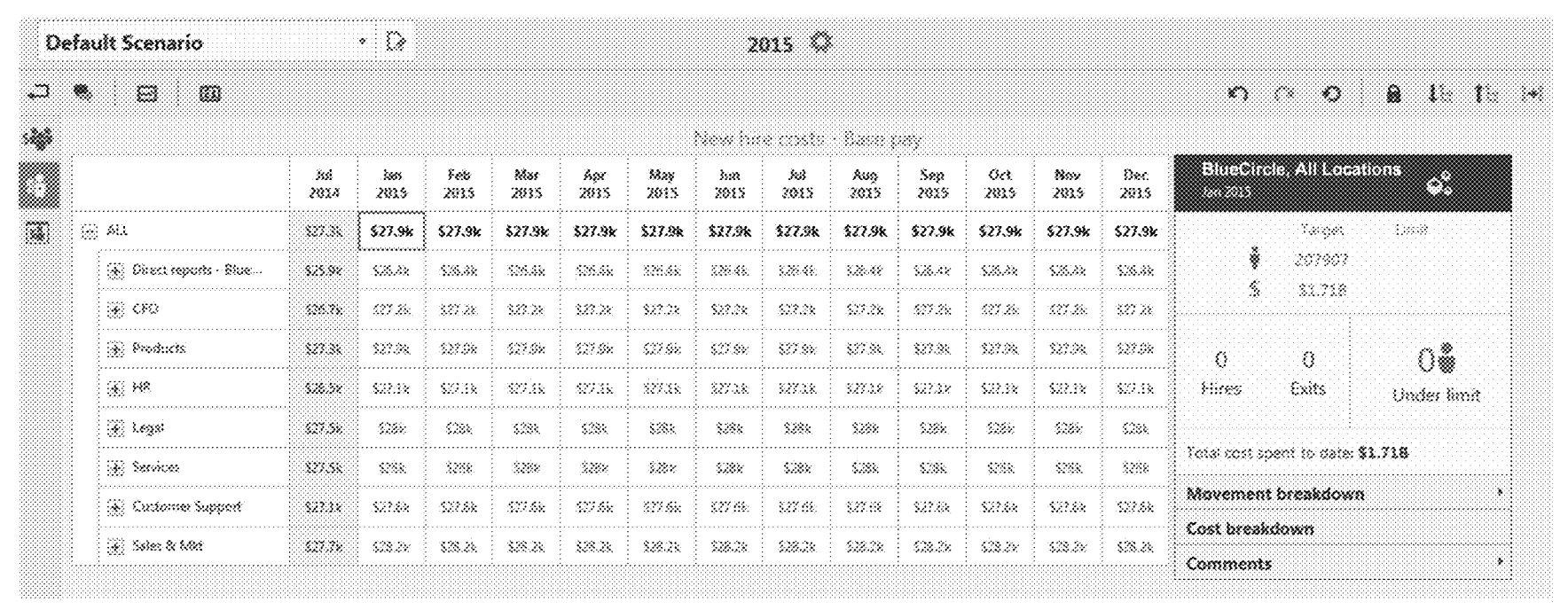
Figure 10:
Figure 11:
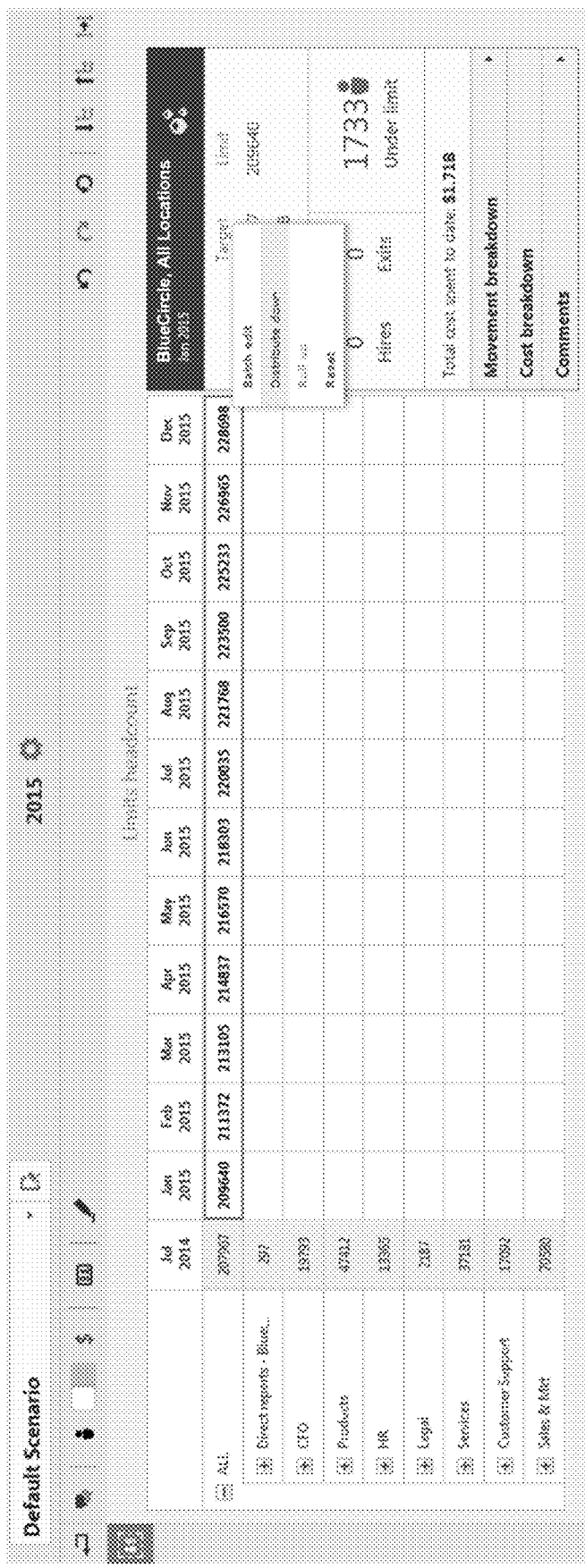
Figure 12:
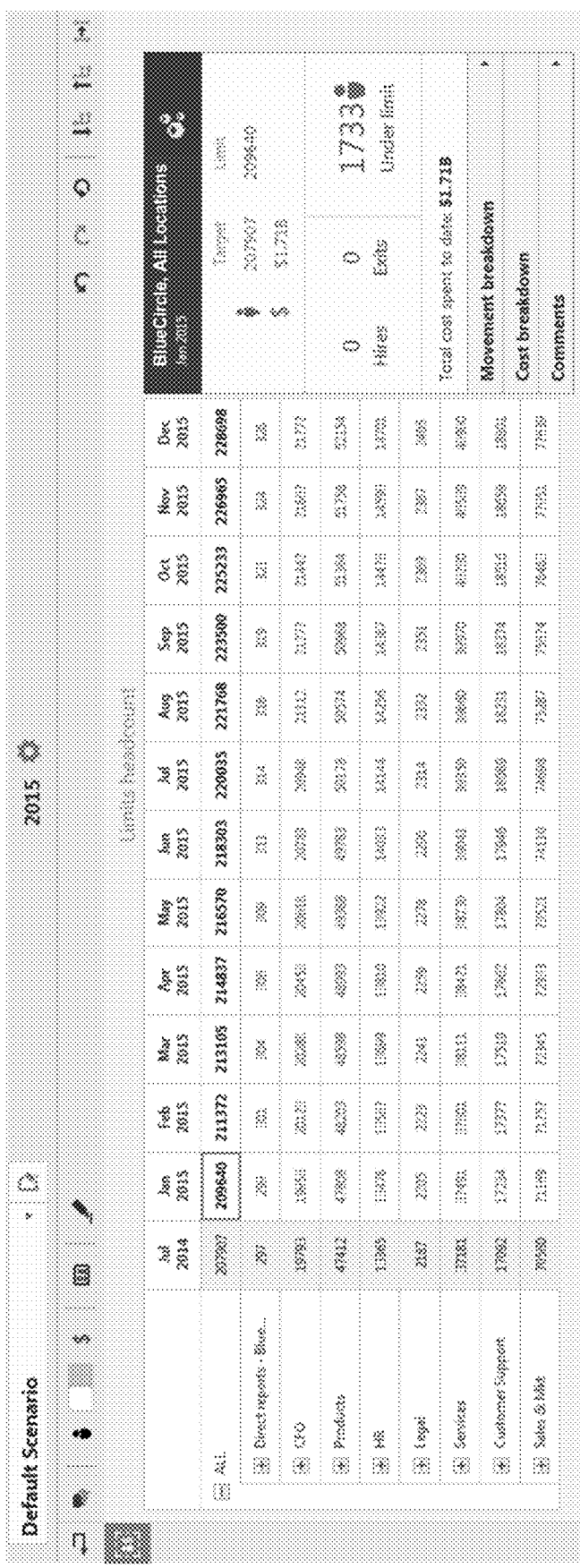
Figure 13:
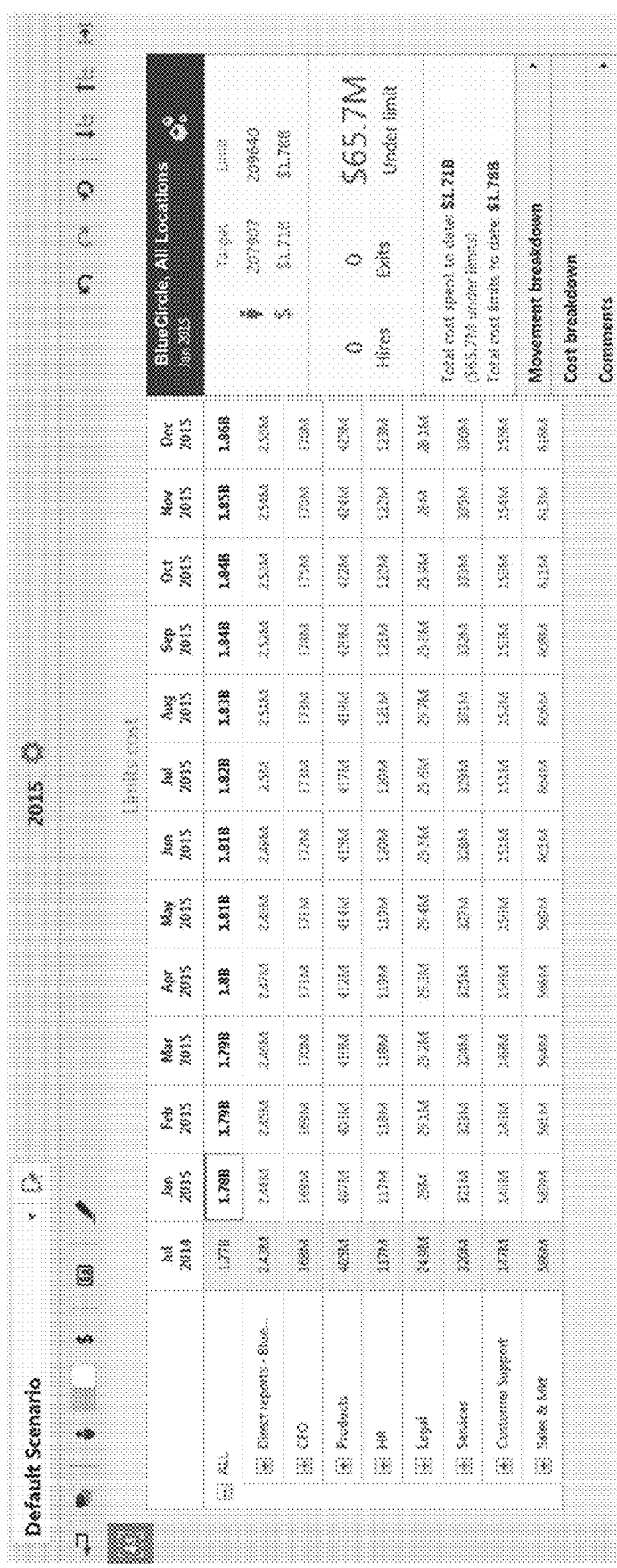
Figure 14:
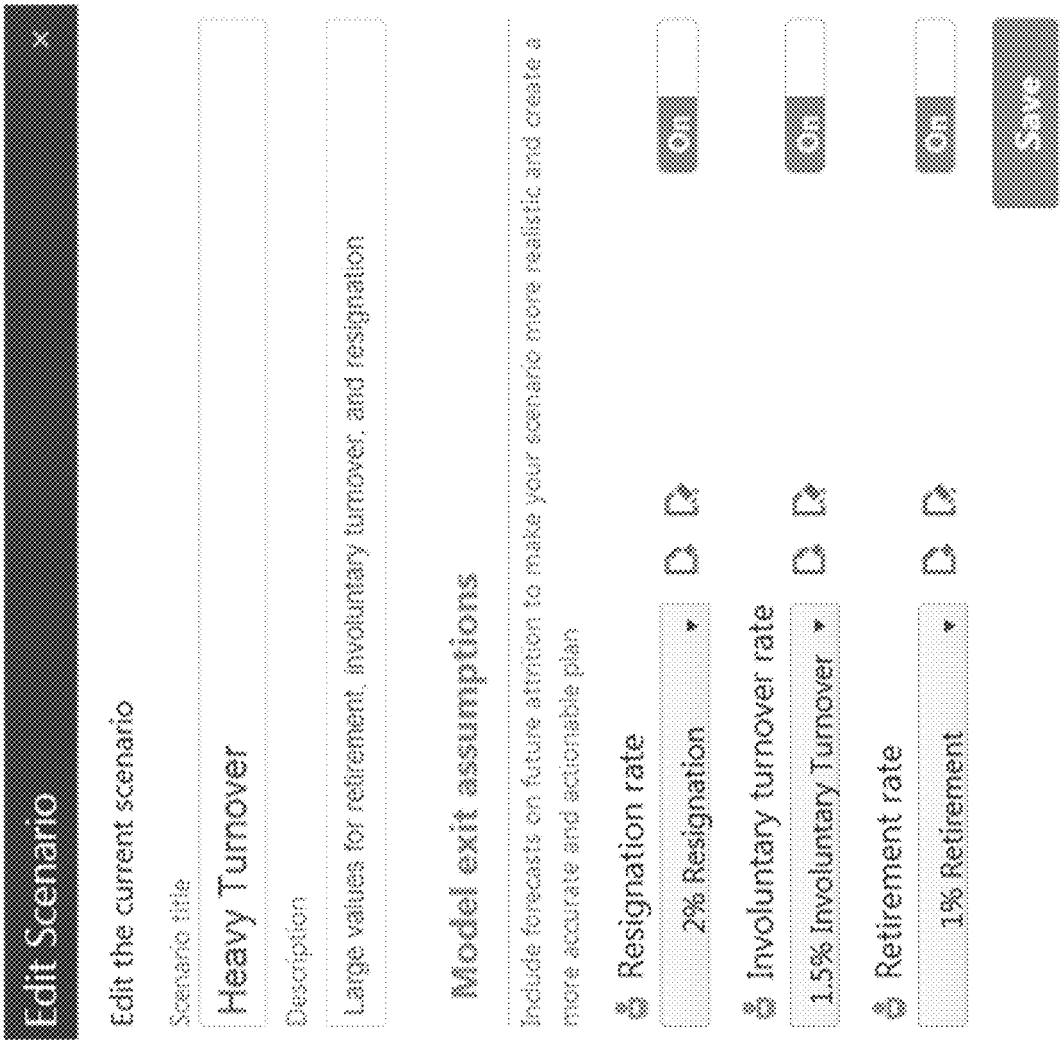

The GUI may also include a button 515 that is operable to define cost assumptions and plan limits, so that financial concepts can be connected with workforce requirements. Examples of cost assumptions may include existing workforce costs (e.g., base pay, bonus, contingent workforce, employment insurance and taxes, health benefits, long term incentive, pay for time not worked, supplemental pay, and workforce allocations), new hire costs (e.g., base pay, bonus, contingent workforce, employment insurance and taxes, health benefits, long term incentive, pay for time not worked, supplemental pay, and workforce allocations), and hiring event costs (e.g., agency cost, referral cost, and relocation cost). As an example, FIGS. 7-9 illustrate increasing new hire base pay by 2%. The 2% increase in base pay is distributed across all levels of the plan (e.g., "ALL," "Direct Reports," "Products," etc.). As additional examples, FIGS. 10-12 illustrate setting and distributing down a 10% limit on headcount growth, and FIG. 13 illustrates the result of setting and distributing down a 5% limit on cost. Limits may enable the user to define values in the planning grid that a scenario should meet in order to be considered viable. Limits may include, but are not limited to, headcount and headcount cost limits, as shown in FIGS. 10-13.

As described above, the WFP planning application described herein may enable the user to define assumptions regarding costs and turnover on a per-scenario basis. In FIG.

14 the default scenario is renamed "Heavy Turnover," and assumes a steady 2% resignation rate, 1.5% involuntary turnover rate, and 1% retirement rate (which may be defined by a user using GUIs similar to the GUIs FIGS. 4-5).

In some embodiments, a turnover assumption may be defined using a different dimension hierarchy than a scenario, even though the time granularity of the assumption matches the scenario and the time span of the assumption includes the time span of the scenario. In such a case, a best fit approach may be applied to each row of a scenario to find the assumption row with the most matching members to the scenario row. Due to the hierarchical nature of plans, assumptions may be calculated at leaf levels of plans and assumption values may be aggregated up from the leaf levels. Turnover assumptions may be a de-annualized percentage value, and turnover values may be calculated using the formula: [(Cell target headcount*Cell turnover rate)+ Carry from previous period]. When a non-integer value of headcount is computed, the carry is the remaining decimal value representing partial turnover, which rolls over to the next period in the row. The first time period of the plan may be provided a random (or zero) carry value to begin calculations.

Cost assumptions may be annualized currency values. Existing population cost may be calculated using the formula: [Previous period cost+(Previous period cost*cost percent change for existing headcount)]. Hiring cost may be calculated using the formula: [New hire per headcount cost*new hire count]. Turnover cost may be calculated using the formula: [Existing population per headcount cost*turnover count].

In a particular embodiment, when limits are entered into the plan, three additional pieces of functionality may be enabled in the WFP application: fitting to limit(s), highlighting, and freezing hiring. For cells that have limits, fitting to limit(s) cause the WFP application to adjust the headcount value of each selected cell such that a headcount limit and/or a cost limit for the cell is adhered to as closely as possible. As shown in the example of FIG. 15, fitting to limit may include fitting to headcount, fitting to cost, and fitting to headcount and cost. To fit to headcount, the WFP application may determine adjusted headcount values such that an increase in headcount by one will cause the cell to be over the limit. In a particular embodiment, fitting is constrained to selected cell(s), and limits for child cells may be ignored.

Fitting to cost for a cell may be a two-step algorithm. In the first step, the WFP application may determine an upper bound for the cell, i.e., the headcount value for which the cell will be over the cost limit. To determine the upper bound for the cell, the WFP application may double the headcount value of the cell, distribute the additional headcount to "leaf" cells (the lowest hierarchical level(s) of the plan for the dimensions of the selected cell), and aggregate results up until the cost limit is exceeded. To illustrate, a particular cell may have a cost limit of $5 million and a headcount value of 1,000 corresponding to a $2 million dollar cost. The WFP application may double the headcount to 2,000, resulting in a cost of $4 million. Because $4 million is under the cost limit of $5 million, the WFP application may double the headcount again, to 4,000, resulting in a cost of $8 million. Because $8 million is greater than the cost limit of $4 million, the upper bound for the cell is found to be 4,000.

In the second step of the algorithm, a binary search of headcount values is performed using the upper bound and the same distribution down/aggregation up pattern. As described further herein, the distribution down pattern may correspond to a "distribute to children option" (e.g., when the cost fitting feature increases and decreases headcount, the distribution down pattern is distributing headcount to children). The binary search may be completed when a value at or just under the cost limit is found. To illustrate, continuing the previous example, the WFP application may divide the upper bound of 4,000 in half, resulting in a headcount of 2,000 and $4 million cost, which is less than the $5 million limit. The WFP application may then test the midpoint of 2,000 and 4,000, i.e., a headcount of 3,000. When the headcount is 3,000, the cost is $6 million, which is above the cost limit. The WFP application may then test a headcount of 2,500, which is the midpoint of 2,000 and 3,000. When the headcount is 2,500, the cost is $5 million, which is equal to the cost limit. Thus, in this example, the binary search may terminate with a headcount of 2,500, which is the largest possible headcount value without exceeding the cost limit. The two-step algorithm may thus represent an interactive target-driven process to reverse calculate values for different cells of the plan in view of defined limits and cost/turnover assumptions.

Figure 16:
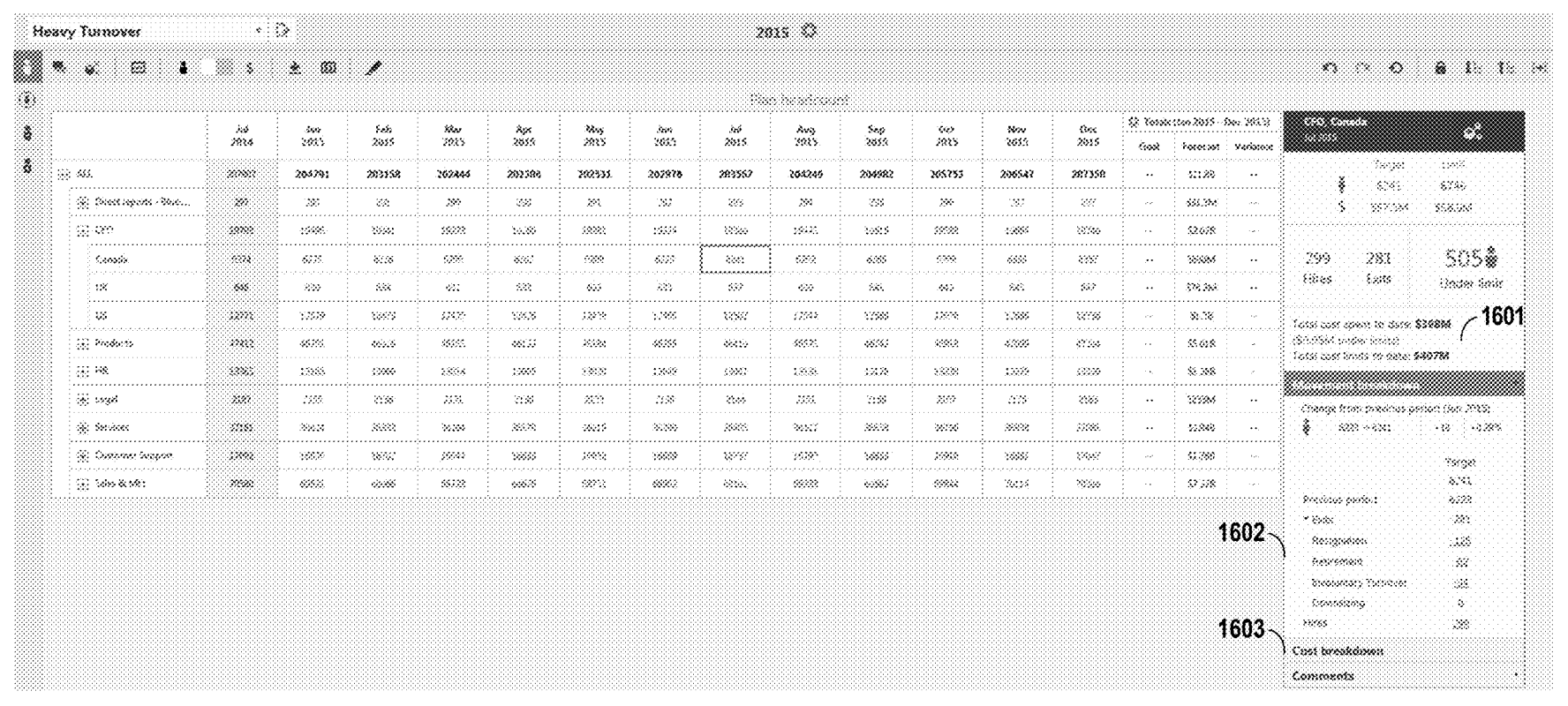
Figure 17:
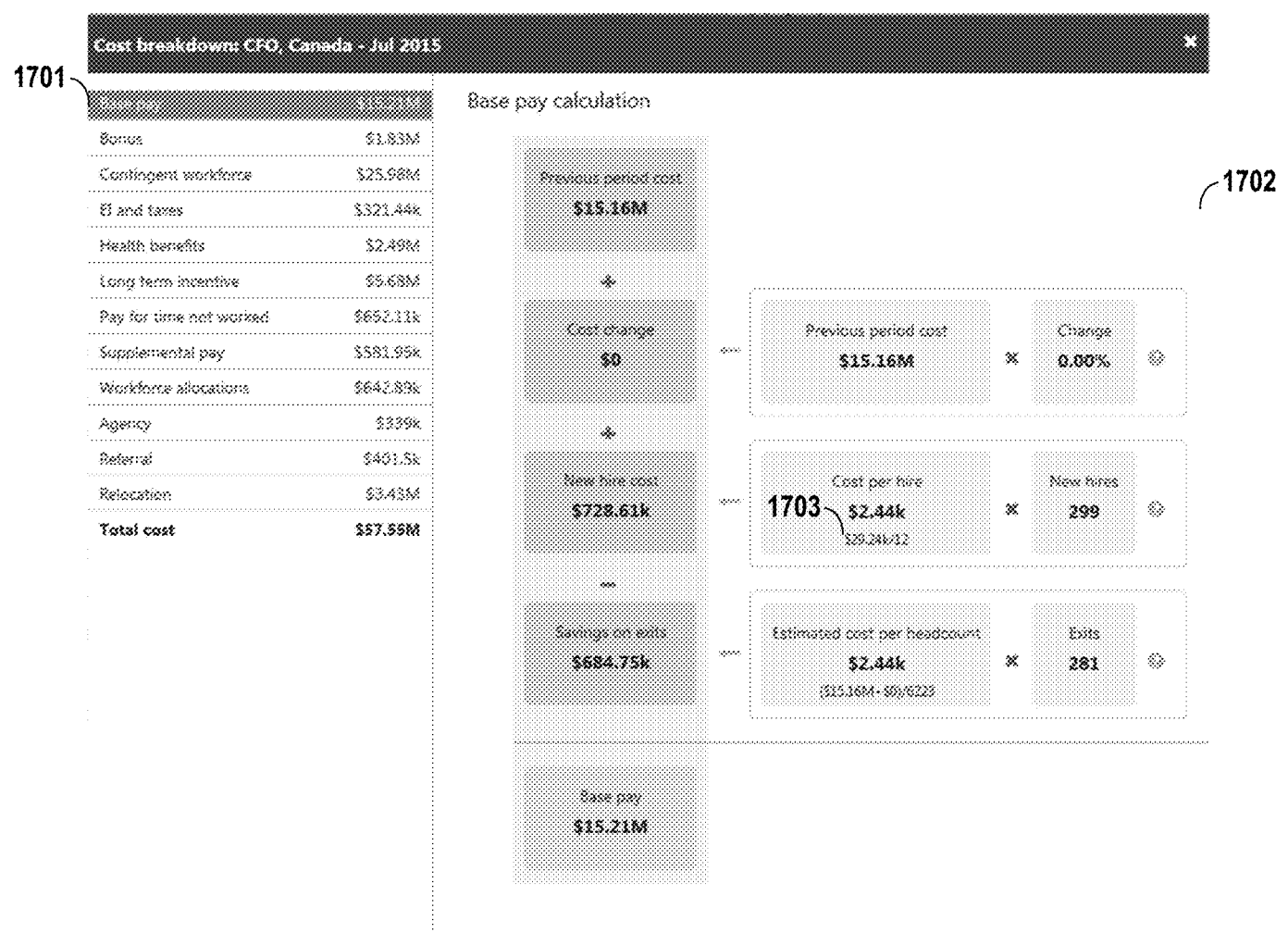

FIG. 16 depicts the "Heavy Turnover" scenario after the above fitting to cost algorithm is applied. As shown at 1601, the CFO organization in Canada for July 2015 (which corresponds to the selected cell in the grid) is $8.95 million dollars under the cost limit for that cell. Further, as shown at 1602, the WFP application provides a movement breakdown for the selected cell, including projected resignations, retirements, involuntary turnovers, downsizing, and hires. Selection of a cost breakdown GUI element 1603 may display an itemized explanation of projected costs for the given cell, as shown in FIG. 17. In FIG. 17, a GUI element 1701 for base pay is selected, resulting in display of the base pay calculation used by the WFP application, at 1702. Notably, the $29.24 k cost shown at 1703 is a result of the 2% base pay increase assumption that the user previously defined in accordance with FIGS. 7-9. By selecting the GUI elements for "bonus," "contingent workforce," etc., the user may view calculation breakdowns for other cost factors.

Figure 18:
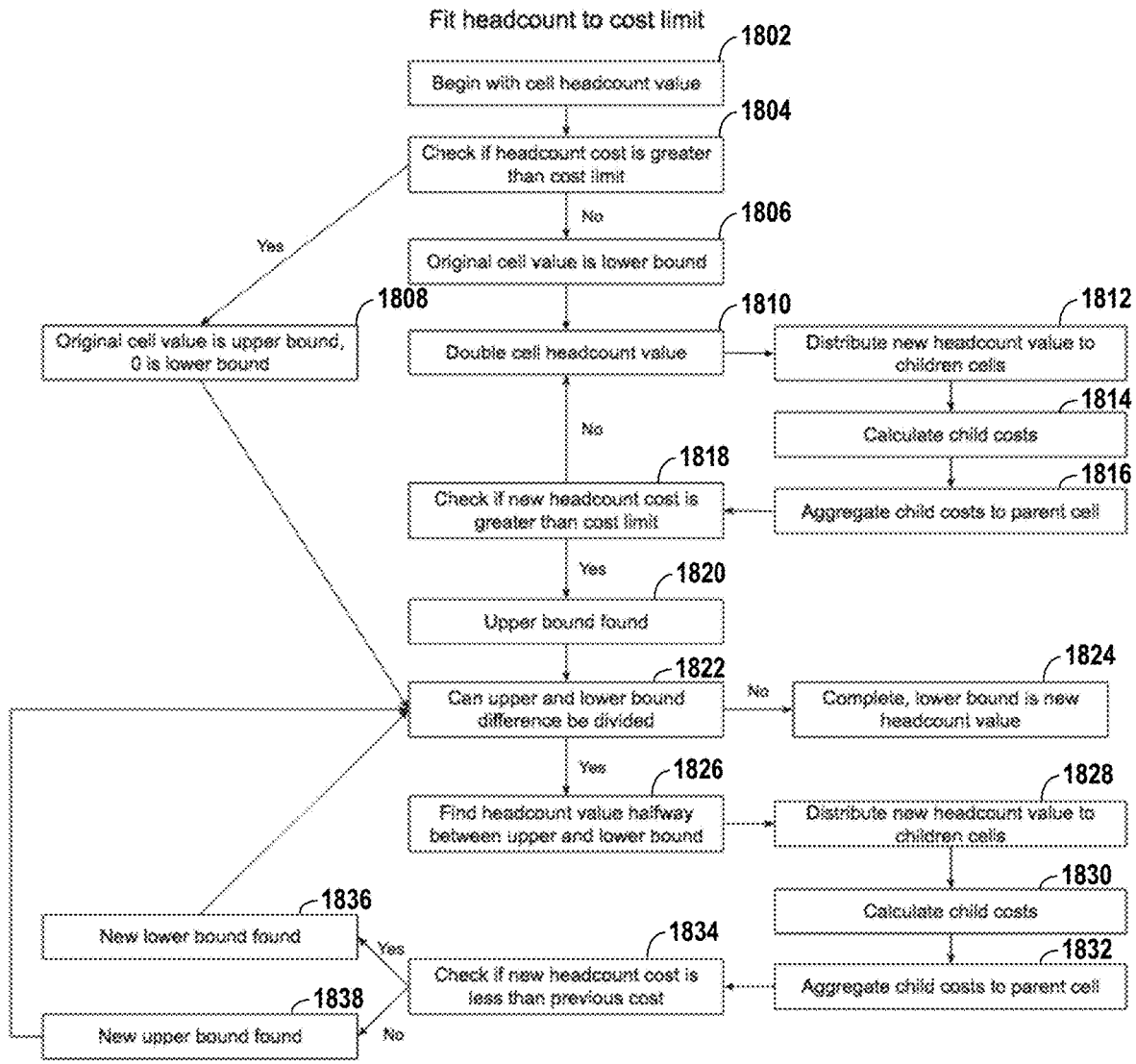

FIG. 18 depicts one illustrative example of a method of fitting headcount to cost limit scenario. In FIG. 18, the method begins with a cell headcount value, at 1802. At 1804, the method includes determining if a headcount cost is greater than a cost limit, at 1804. FIG. 18 illustrates that, in the event that headcount cost is not greater than the cost limit, an original cell value is used as a lower bound, as shown at 1806. In the event that the headcount cost is greater than the cost limit, the original cell value is used as an upper bound, with zero being used as a lower bound (as shown at 1808). When the original cell value is the lower bound (as shown at 1806), the method includes increasing (e.g., doubling) the cell headcount value, as shown at 1810. The method may continue to 1812, where the new headcount value is distributed to child/children cells, the child costs are calculated (as shown at 1814), and the child costs are aggregated to the parent cell (as shown at 1816). The method may proceed to determine whether the new headcount cost is greater than the cost limit, at 1818. In the event that the new headcount cost is not greater than the cost limit, the method may return to 1810 (where the cell headcount value may be increased (e.g., doubled) again. In the event that the new headcount value is greater than the cost limit, FIG. 18 illustrates that the upper bound is found, at 1820.

FIG. 18 further illustrates that the method may include determining whether an upper and lower bound distance can be divided, at 1822. As shown in FIG. 18, the determination (as shown at 1822) may be made after assigning the original cell value as the upper bound and zero as the lower bound (as shown at 1808) or after the upper bound is found (as shown at 1820). In the event that the upper and lower bound difference cannot be divided, the method may end (as shown at 1824), with the lower bound representing the new headcount value. In the event that the upper and lower bound difference can be divided (at 1822), the method may include determining a headcount value between the upper and lower bound (e.g., halfway between the upper and lower bound), at 1826. The method may further include distributing the new headcount value to children cells (at 1828), calculating child costs (at 1830), and aggregating child costs to the parent cell (at 1832). The method may proceed to determine whether the new headcount cost is less than the previous cost, as shown at 1834. FIG. 18 illustrates that if the new headcount cost is less than the previous cost, a new lower bound is found (as shown at 1836, which includes returning to 1822), and if the new headcount cost is not less than the previous cost, a new upper bound is found (as shown at 1838, which includes returning to 1822).

Figure 19:
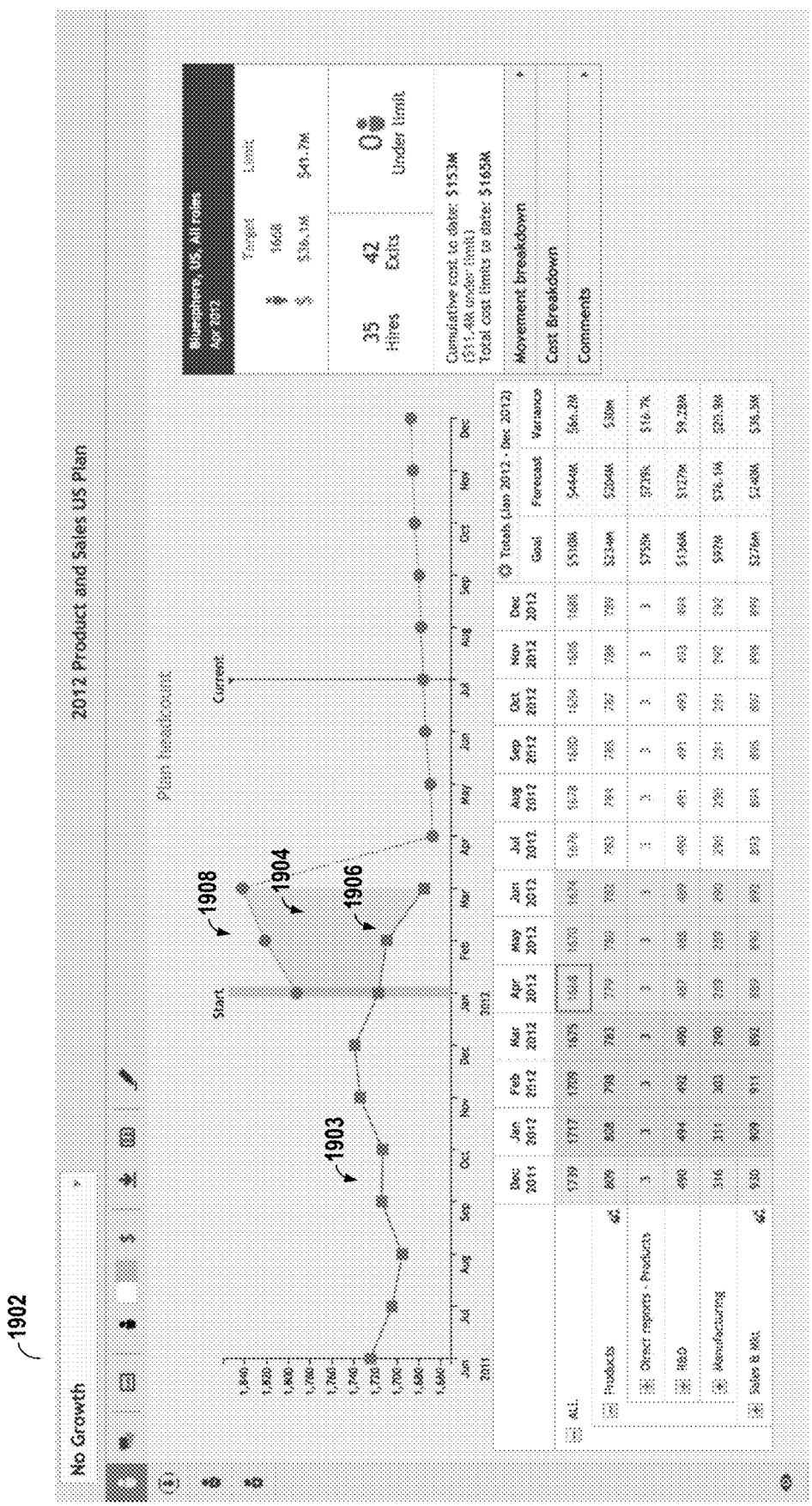

FIG. 19 illustrates an example of a comparison of target value(s) and actual value(s) as time progresses. To illustrate, FIG. 19 shows a planning scenario 1902 (e.g., a "No Growth" scenario) for headcount. FIG. 19 further illustrates historical headcount data 1903 (e.g., headcount data from June 2011 to December 2011) prior to a start (e.g., January 2012) of the planning scenario 1902. FIG. 19 illustrates that a user may compare target headcount values to actual headcount values. As described further herein with respect to FIG. 21, the user may create a new planning scenario (or adjust the first planning scenario 1902) to account for deviations between target/actual values after the start of the planning scenario 1902.

In FIG. 19, a shaded area 1904 illustrates a deviation between target headcount values 1906 and actual headcount values 1908 (e.g., from January 2012 to March 2012, corresponding to a first three months of the planning scenario 1902). The target headcount values 1906 may be determined based on actual historical headcount data (e.g., the historical headcount data 1903 for the six month time period prior to January 2012) for use as base data for forecasting purposes.

Figure 20:
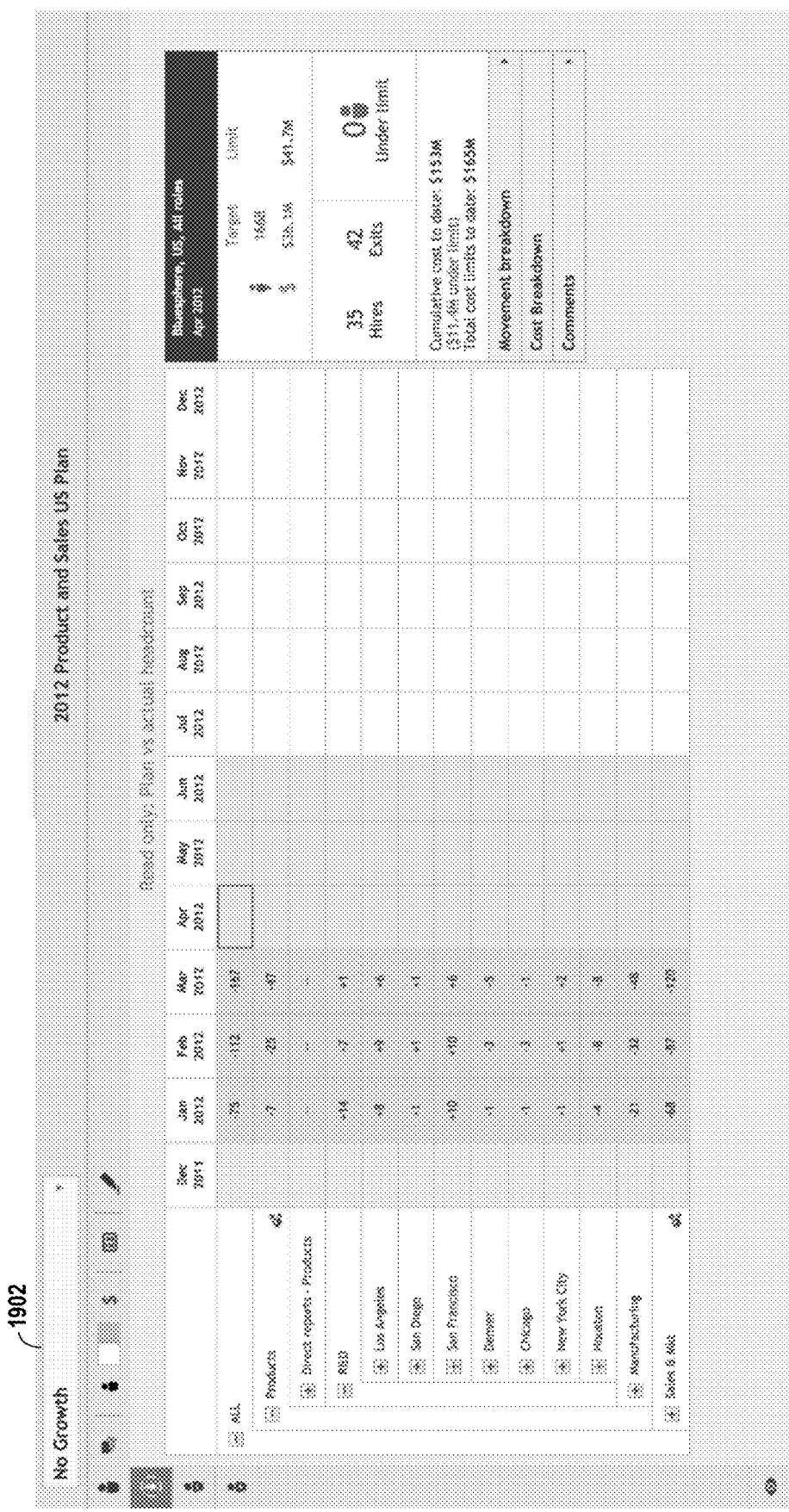

FIG. 20 illustrates that within a particular planning scenario (e.g., the "No Growth" scenario of FIG. 19), a user can review deviations between target headcount values and actual headcount values for various section of the plan. For illustrative purposes, FIG. 20 shows deviations between target headcount values and actual headcount values based on the No Growth planning scenario for various cities associated with different R&D locations.

Figure 21:
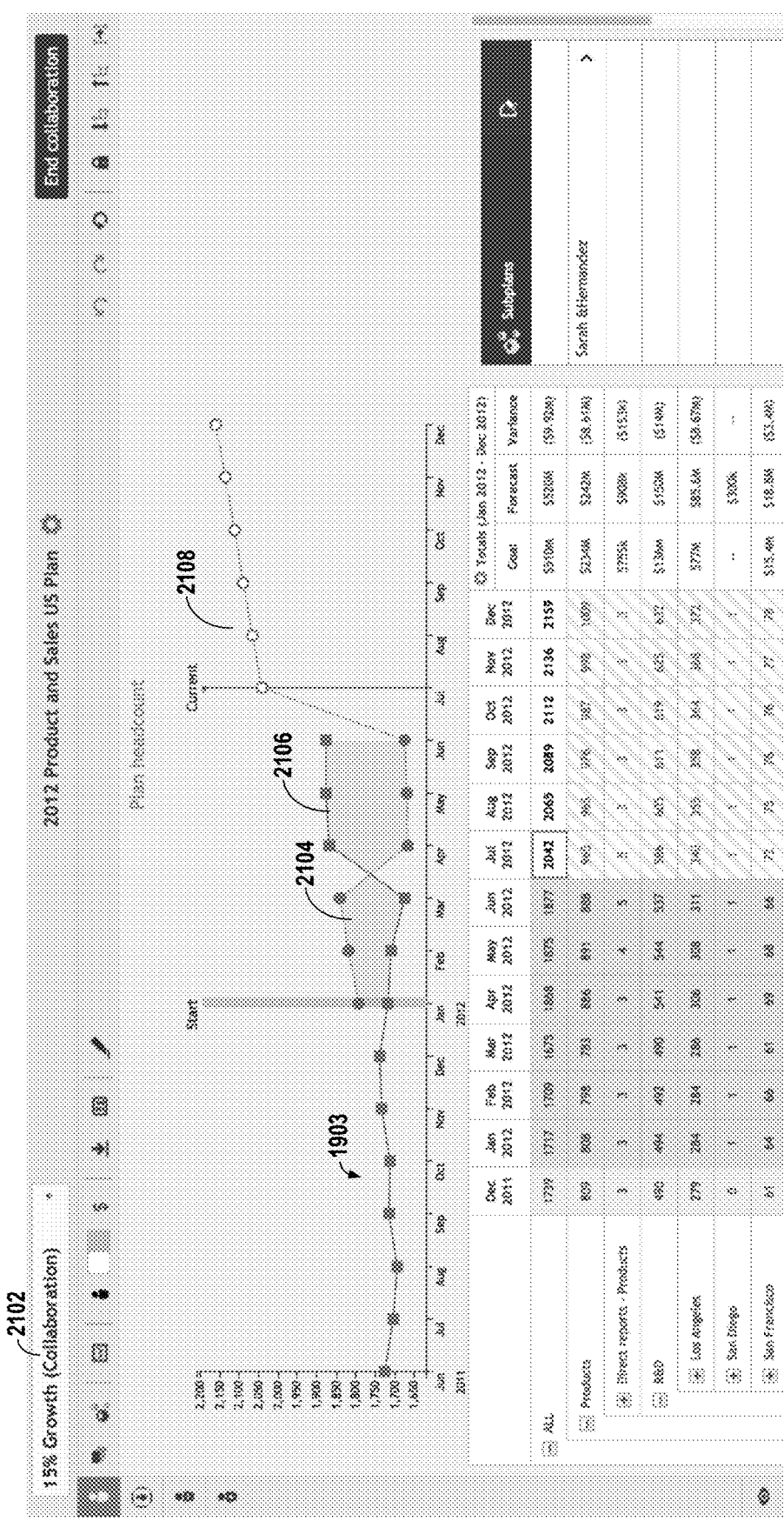

FIG. 21 illustrates that a user may create a second planning scenario 2102 (e.g., a "15% Growth" plan) that is different from an original planning scenario (e.g., the "No Growth" scenario 1902 of FIGS. 19 and 20) in order to account for deviations between target headcount values and actual headcount values over a previous time period (e.g., a six month period prior to a "Current" time period, such as July 2012 in the example of FIG. 21). FIG. 21 illustrates a first deviation 2104 between target headcount values and actual headcount values over a first three-month period prior to the "Current" time period (e.g., January 2012 to March 2012) and a second deviation 2106 between target headcount values and actual headcount values over a second three-month period prior to the "Current" time period (e.g., from April 2012 to June 2012). FIG. 21 illustrates target multiple target headcount values 2108 starting from the "Current" time period (e.g., from July 2012 to December 2012) that are determined based on the second planning scenario 2102 (e.g., the "15% Growth" plan).

Figure 22:
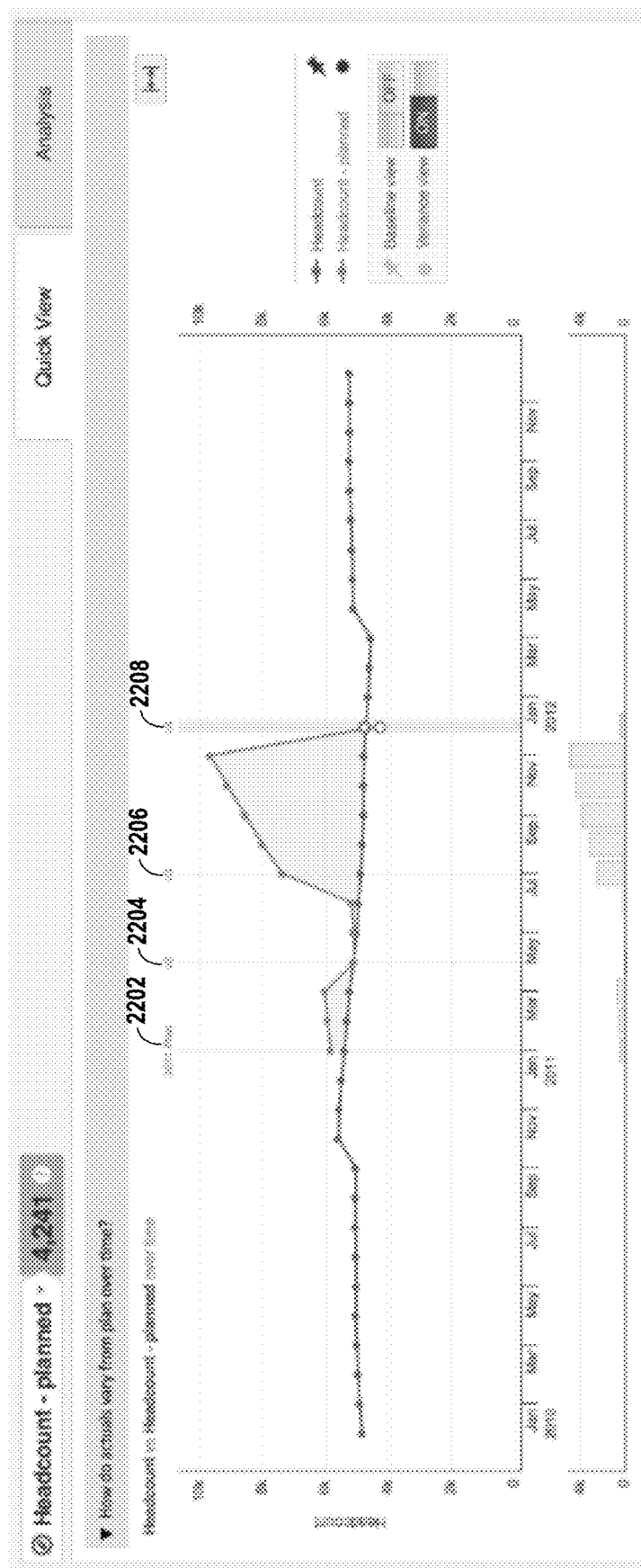

FIG. 22 illustrates an example of "workforce analytics" interface. After a workforce plan (e.g., a Headcount plan in the example of FIG. 22) is published, the planned and forecasted metric(s) can be monitored against actual metric(s). A planner may return to the workforce planning application to revise a plan based on the actual metric(s) and re-publish to monitor the revised plan. FIG. 22 illustrates that a first plan 2202 (e.g., a "2011 Plan") may be revised to a second plan 2204 (e.g., a "v2" plan) based on a comparison of the forecasted headcount values to the actual headcount values (e.g., over a time period from January 2011 to April 2011). FIG. 22 further illustrates that the second plan 2204 (e.g., the "v2" plan) may be revised to a third plan 2206 (e.g., a "v3 plan") based on a comparison of the forecasted/actual headcount values (e.g., over a time period from April 2011 to July 2011). FIG. 22 further illustrates that the third plan 2206 (e.g., the "v3" plan) may be revised to a fourth plan 2208 (e.g., a "v4 plan") based on a comparison of the forecasted/actual headcount values (e.g., over a time period from July 2011 to December 2011).

Figure 23:
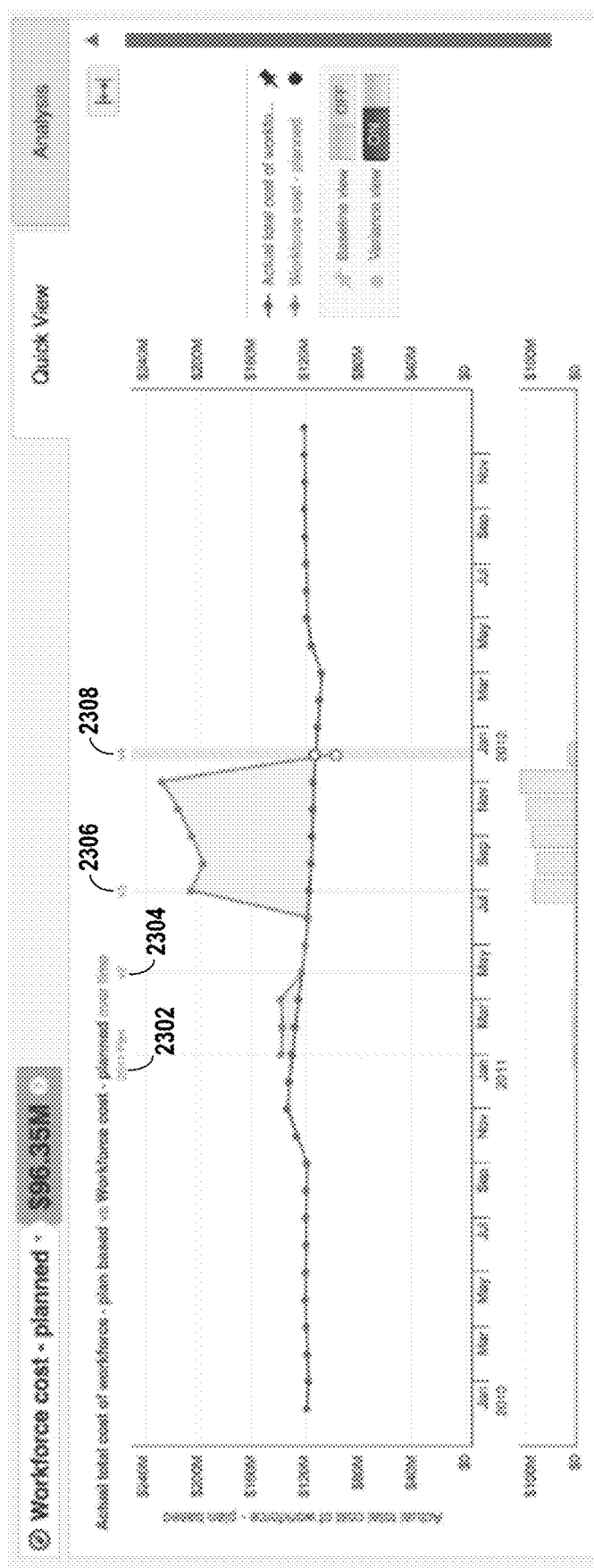

FIG. 23 illustrates another example of "workforce analytics" interface. After a workforce plan (e.g., a Workforce cost plan in the example of FIG. 23) is published, the planned and forecasted metric(s) can be monitored against actual metric(s). A planner may return to the workforce planning application to revise a plan based on the actual metric(s) and re-publish to monitor the revised plan. FIG. 23 illustrates that a first plan 2302 (e.g., a "2011 Plan") may be revised to a second plan 2304 (e.g., a "v2" plan) based on a comparison of the forecasted workforce cost values to the actual workforce cost values (e.g., over a time period from January 2011 to April 2011). FIG. 23 further illustrates that the second plan 2304 (e.g., the "v2" plan) may be revised to a third plan 2306 (e.g., a "v3 plan") based on a comparison of the forecasted/actual workforce cost values (e.g., over a time period from April 2011 to July 2011). FIG. 23 further illustrates that the third plan 2306 (e.g., the "v3" plan) may be revised to a fourth plan 2308 (e.g., a "v4 plan") based on a comparison of the forecasted/actual workforce cost values (e.g., over a time period from July 2011 to December 2011).

Figure 24:
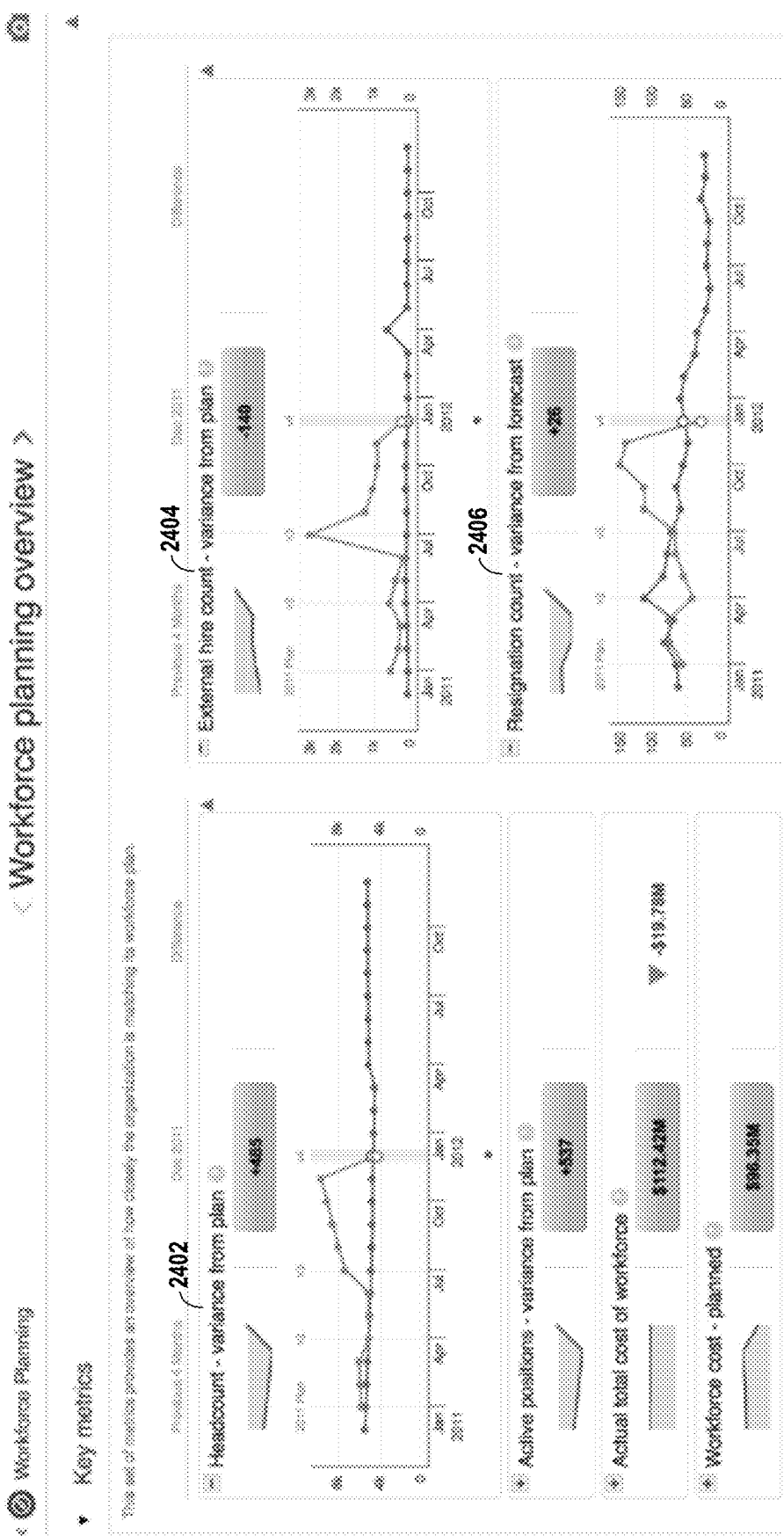

FIG. 24 illustrates another example of a "workforce analytics" interface. In the example of FIG. 24, a user may compare forecasted/actual values for various metrics in a single interface (along with identifications of when plans were revised e.g., from a first plan to a v2 plan, to a v3 plan, to a v4 plan, etc.). To illustrate, one portion of the interface of FIG. 24 shows a "Headcount—variance from plan" 2402, another portion of the interface shows "External hire count—variance from plan" 2404, another portion of the interface shows "Resignation cost—variance from plan" 2406. It will be appreciated that alternative and/or additional forecasted/actual values may be presented in a single interface.

Figure 25:
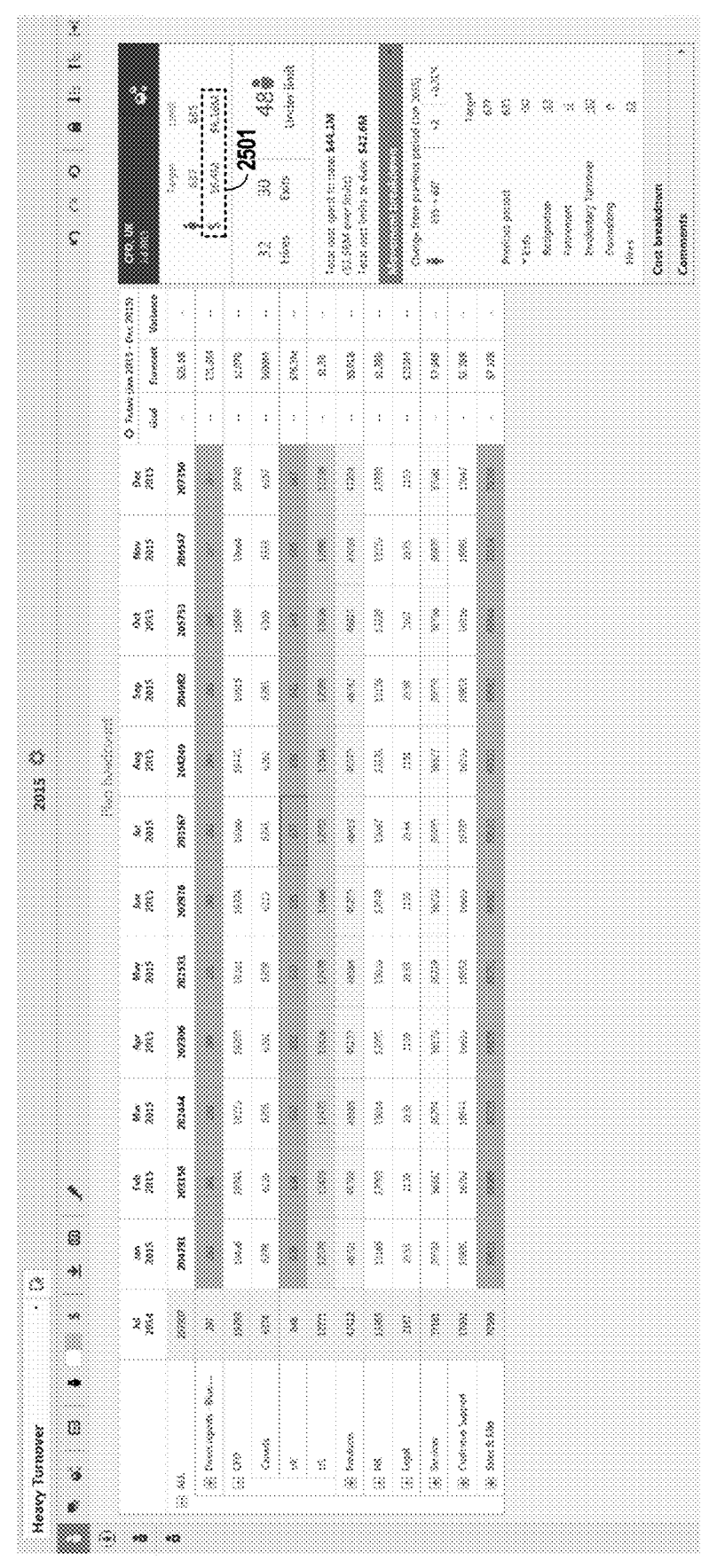

FIG. 25 illustrates an example of highlighting in which increased highlighting is used to identify cells that are further over the limit. To illustrate, the selected CFO, UK cell for July 2015 has a cost of $6.4 million, which is over the cost limit of $6.16 million for the cell, as shown at 2501. Highlighting plan values vs. limits as shown in FIG. 25 may provide the user a way to quickly identify problematic parts of a plan for further attention and may provide the user a quick high-level view of whether a plan complies with budgetary constraints.

Figure 26:
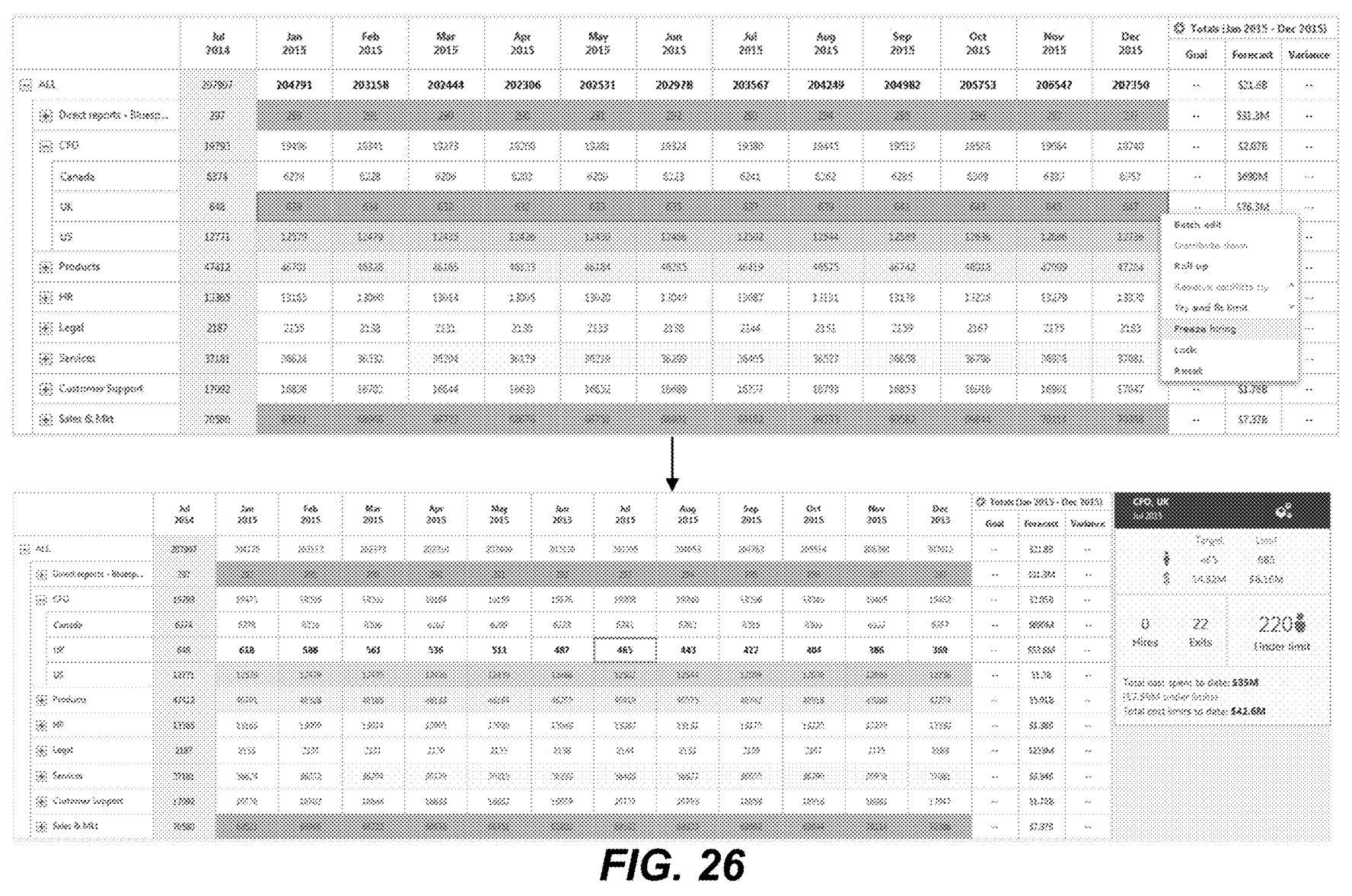

FIG. 26 illustrates freezing hiring in the CFO organization in the UK during the entire 2015 year. The freezing hiring functionality may adjust headcount values such that there are no hires for the selected cells. When turnover assumptions are defined, the headcounts in the selected cells will decrease as time progresses due to the hiring freeze. Freezing hiring may thus enable the user to plan for gradual lowering of workforce due to natural attrition. For example, due to the hiring freeze, the July 2015 headcount for the CFO organization in the UK is 465 and has a cost of $4.32 million, which is below the cost limit of $6.16 million.

Figure 27:
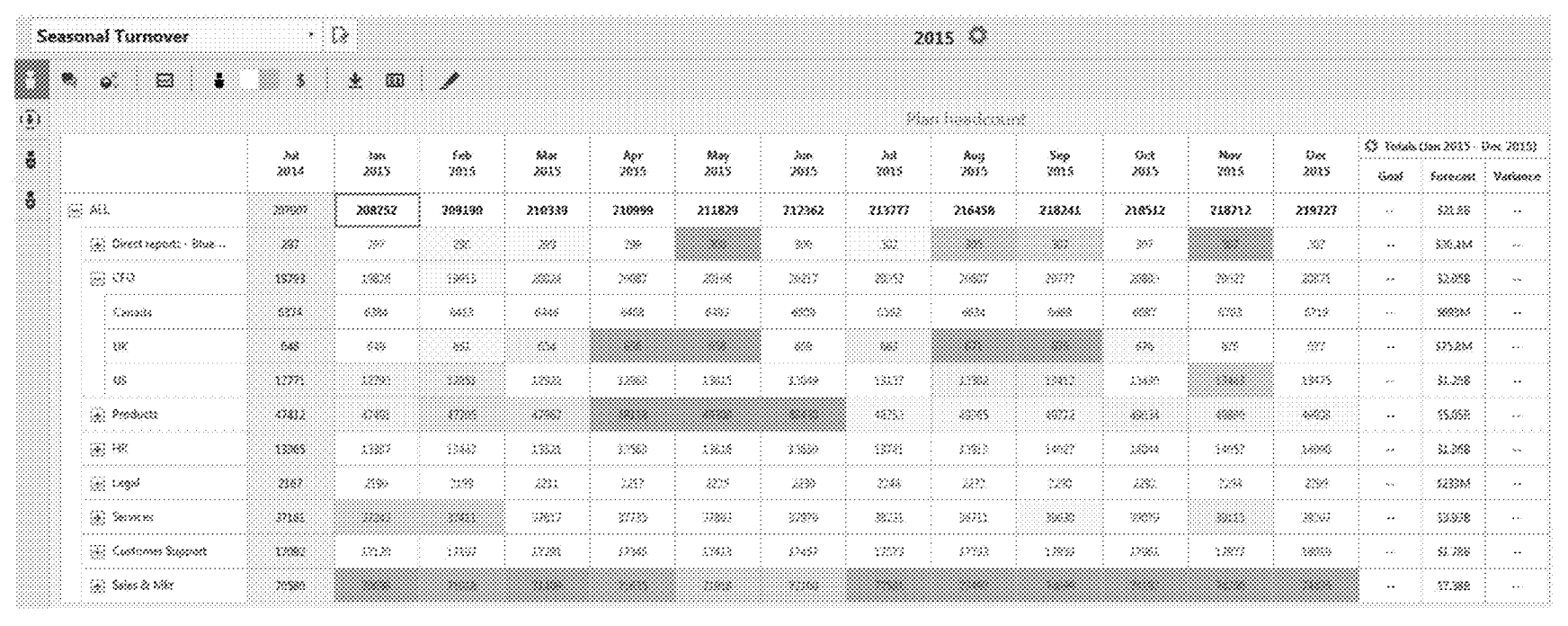
Figure 28:
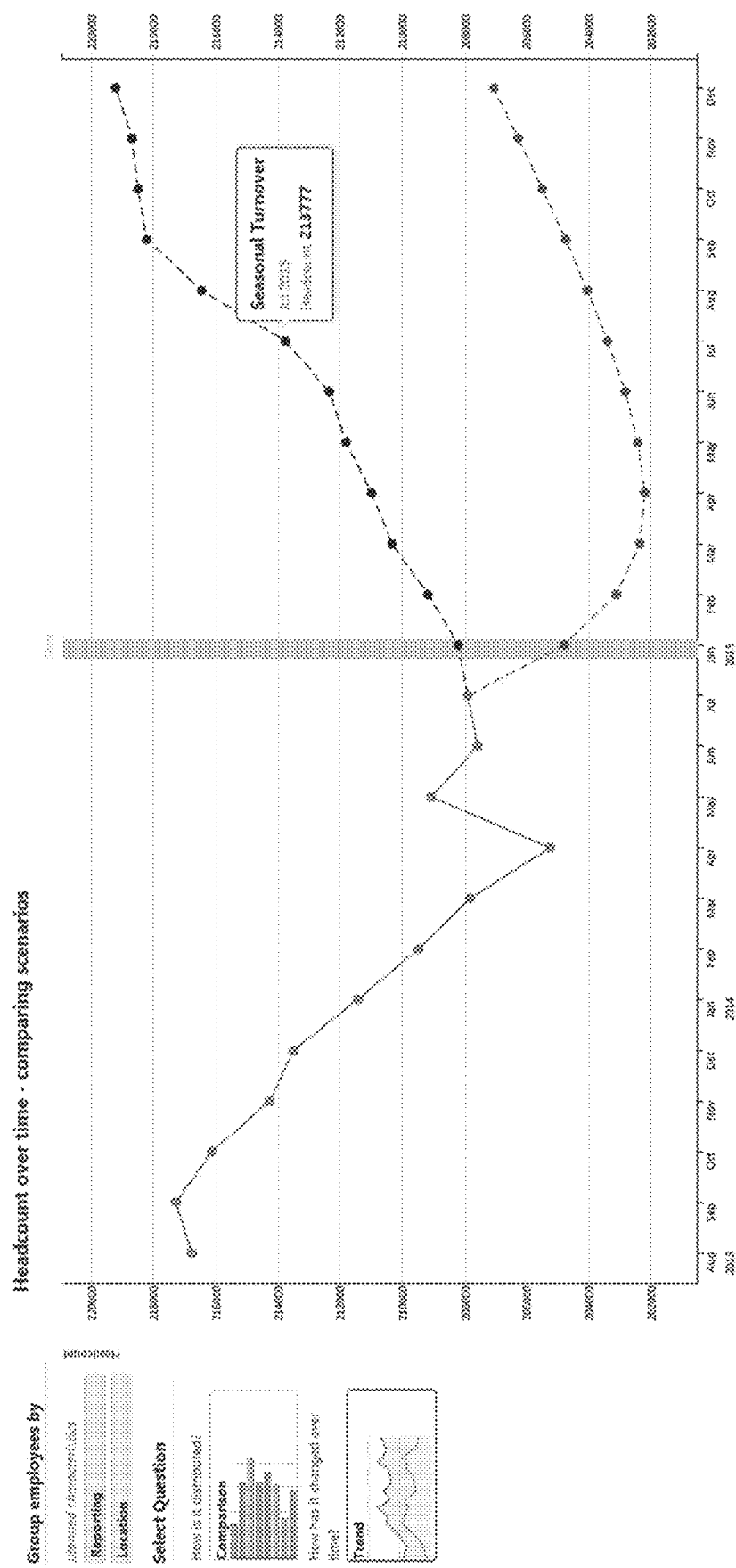

The WFP application of the present disclosure enables the user to compare different scenarios. For example, after creating the "Heavy Turnover" scenario defined above, the user may create a "Seasonal Turnover" scenario in which turnover assumptions use a seasonal forecasting model. FIG. 27 illustrates results of fitting to cost limits in the "Seasonal Turnover" scenario, assuming same 10% headcount growth and 5% cost growth limits as the "Heavy Turnover" scenario. To compare scenarios, the user may select the analyze tab 502 of FIG. 1. In the resulting GUI, the user may view bar charts, line charts, etc. to compare data (e.g., headcount, cost, turnover, etc.) from the different scenarios of the plan. For example, FIG. 28 illustrates an exemplary analysis GUI that may be used to compare headcounts in the "Seasonal Turnover" and "Heavy Turnover" scenarios. Notably, the line chart in FIG. 28 includes a combination of both historical data and forecasted data. The WFP application of the present disclosure advantageously supports analysis (e.g., query execution) that spans a time frame covering both the past and the future. A plan generated by the WFP application thus represents a data input for computation, similar to historical data from a database, internal/external benchmark data, user input, etc.

FIGS. 2-28 thus illustrate exemplary WFP GUIs operable to create plans/scenarios/assumptions, set plan limits, fit plan cells to limit(s), view cost breakdowns for plan cells, highlight cells over limit(s), freeze hiring, and compare/update different scenarios of a plan. It will be appreciated that the WFP application of the present disclosure may thus enable various operations that may be difficult and time-consuming to implement using conventional WFP tools, such as a standalone spreadsheet document.

In a particular embodiment, when a value in a cell of the planning grid is modified, the WFP application may reconcile the adjustment using one of two options: summing to children or distributing to children. When the sum to children option is used, parent cell values of the modified cell are adjusted such that the value each parent cell is the sum of the values in the corresponding child cells, For example, the July 2015 value for CFO may be the sum of July 2015 values for (CFO, Canada), (CFO, UK), and (CFO, US).

When the distribute to children option is used, the values of child cells are adjusted such that their values sum to the value of the parent. A delta value between the parent cell for the time period in question and for the preceding time period is distributed to child cells based on two distribution rules. According to the first rule, the delta value is used to minimize deltas of the child rows that also have a delta compared to the preceding time period. If the parent value is increasing compared to the preceding time period, then child values that are lower than in the preceding time period are also increased until they match the values of the preceding time period. If the parent value is decreasing compared to the preceding time period, then child values that are higher than in the preceding time period are decreased until they match the values of the preceding time period. If multiple child values need adjustment, the delta of the parent cell is distributed based on the ratio of the deltas of individual child cells to the total child delta.

Figure 29:
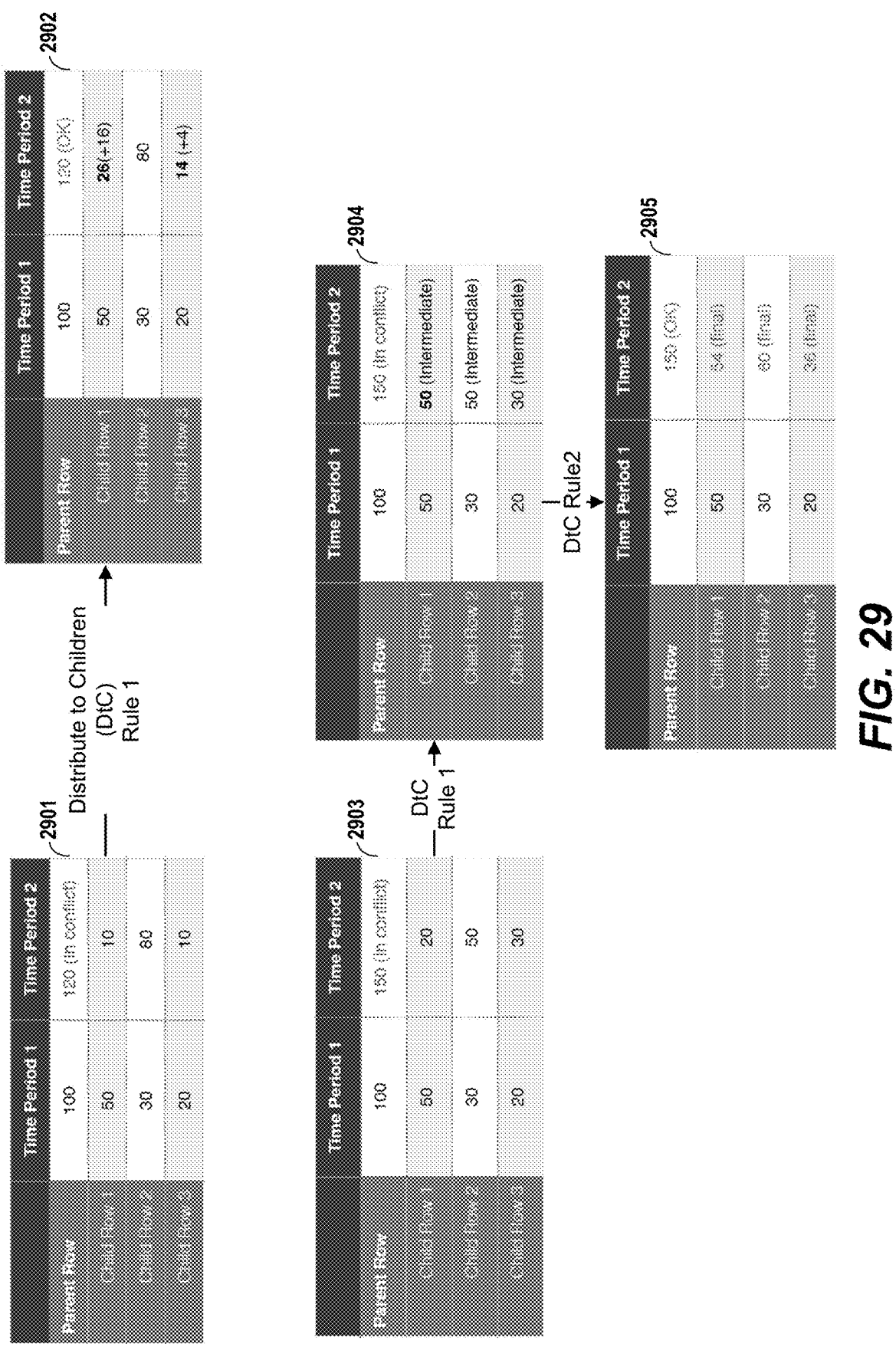
FIG. 29 illustrates examples of resolving a conflict between a parent row and child rows of a grid in a workforce planning application.

To illustrate, in the first example of FIG. 29, there is a +20 delta in the Parent Row, as shown at 2901. The value in Child Row 2 is greater than in the previous time period, whereas the values in Child Rows 1 and 3 are less than in the previous time period. The delta of Child Row 1 is −40 and the delta of Child Row 3 is −10, for a total negative delta of −50. Based on the above rules, Child Row 1 is distributed an additional headcount of (−40/−50)*20=16 and Child Row 2 is distributed an additional headcount of (−10/−50)*20=4. The distributed headcounts are shown in FIG. 29 at 2902.

After the first rule above is met, the application second rule distributes the remaining parent delta among all children using a ratio of child values compared to a previous sum. To illustrate, in the second example of FIG. 29, the Parent Row has a +50 delta compared to the previous time period, as shown at 2903. The delta of Child Rows 1, 2, and 3 are −30, +20, and +10, respectively. Application of the first rule above minimizes negative deviation from the previous period by increasing Child Row 1 to 50, as shown at 2904. The increase in Child Row 1 accounts for +30 of the total +50 delta. The remaining +20 may then be distributed using the original child ratios in Time Period 2 (i.e., ratio for Child Row 1=20/100, ratio for Child Row 2=50/100, and ratio for Child Row 3=30/100). Thus, Child Rows 1, 2, and 3 may be distributed additional headcounts of 4, 10, and 6, respectively, as shown at 2905.

In a particular embodiment, the WFP application of the present disclosure enables collaborative planning workflows. For example, plans with several dimensions that contain many members can become large and difficult for a single user to manage. To alleviate this burden, the WFP application enables a user to assign different sections (e.g., sub-plans) of a "parent" plan to other users. The use of sub-plans may enable the planning workload to be shared amongst multiple users, and the partitioning process can be repeated for multiple levels (e.g., a sub-plan can be further partitioned into sub-sub-plans that can be assigned to other users). In particular embodiments, a plan may initially be editable by and visible only to an owner of the plan, i.e., the creator of the plan. The owner may share the plan with other users, giving the other users viewing and/or editing rights. The owner of a sub-plan may be the user that the sub-plan is assigned to. However, sub-plans may inherit viewing/editing rights that existed in the parent plan. When an action is applied to a plan or sub-plan, the WFP engine 130 may validate the user attempting to perform the action prior to modifying the plan. Plan security is further described with reference to FIG. 40.

Figure 30:
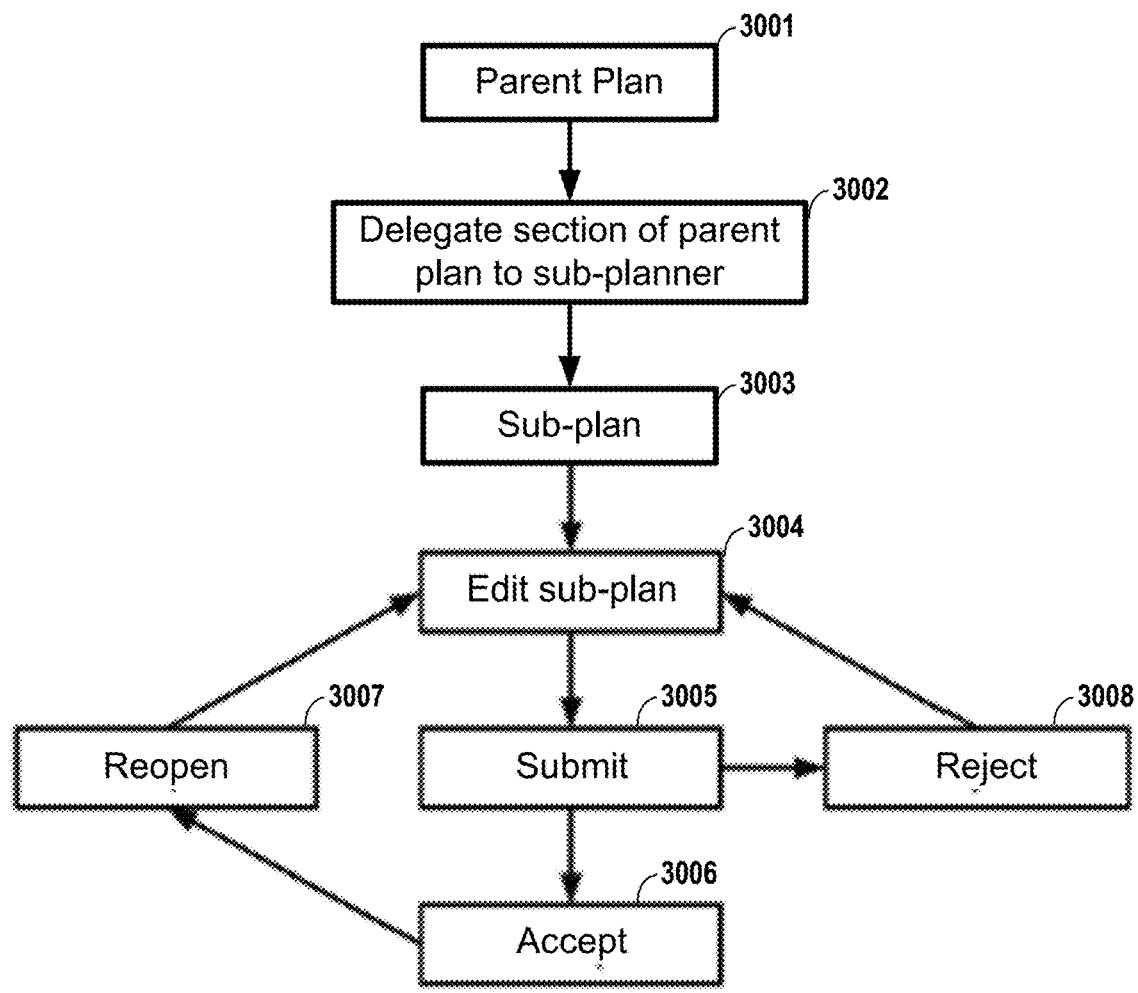
FIG. 30 illustrates a particular embodiment of a collaborative workflow for workforce planning.

FIG. 30 illustrates a flow diagram of a collaboration workflow in accordance with the present disclosure. In an illustrate embodiment, the collaboration workflow may be performed at a WFP application. For example one or more operations described herein with reference to the collaboration workflow of FIG. 30 may be performed at the client instance 112, 122 of FIG. 1 and/or the WFP engine 130 of FIG. 1 in accordance with the screenshots of FIGS. 31-39.

Given a parent plan 3001, a user may delegate 3002 a section of the parent plan, i.e., a sub-plan 3003, to a sub-planner. Although a single sub-plan 3003 is shown in FIG. 30, it should be noted that any number of sub-plans may be created from the parent plan 3001. The sub-plan 3003 may inherit the dimensional hierarchy of the parent plan 3001, or a portion thereof. The sub-plan 3003 may also inherit scenario(s) of the parent plan, including headcounts, turnover, and costs. For example, all scenarios of the parent plan may be included in the same sub-plan, or different scenarios may be assigned to different sub-planners. FIG. 31 illustrates an example of creating a sub-plan of the "2015" plan described with reference to FIGS. 2-28. The sub-plan is for the Products organization, and is being assigned to the sub-planner Sarah Jones. Both the "Heavy Turnover" and the "Seasonal Turnover" scenarios are assigned in the sub-plan, and the base pay cost assumption is locked from editing. The sub-plan has a requested due date of Dec. 15, 2014, and an additional "Role" dimension is added to the framework for the sub-plan.

It should be noted even after a section of the parent plan 3001 has been delegated, the parent plan 3001 can continue to be modified. If a user wishes to "push" a change from the parent plan 3001 to the sub-plan 3003, the user may select a GUI element (not shown) in the WFP application.

Figure 33:
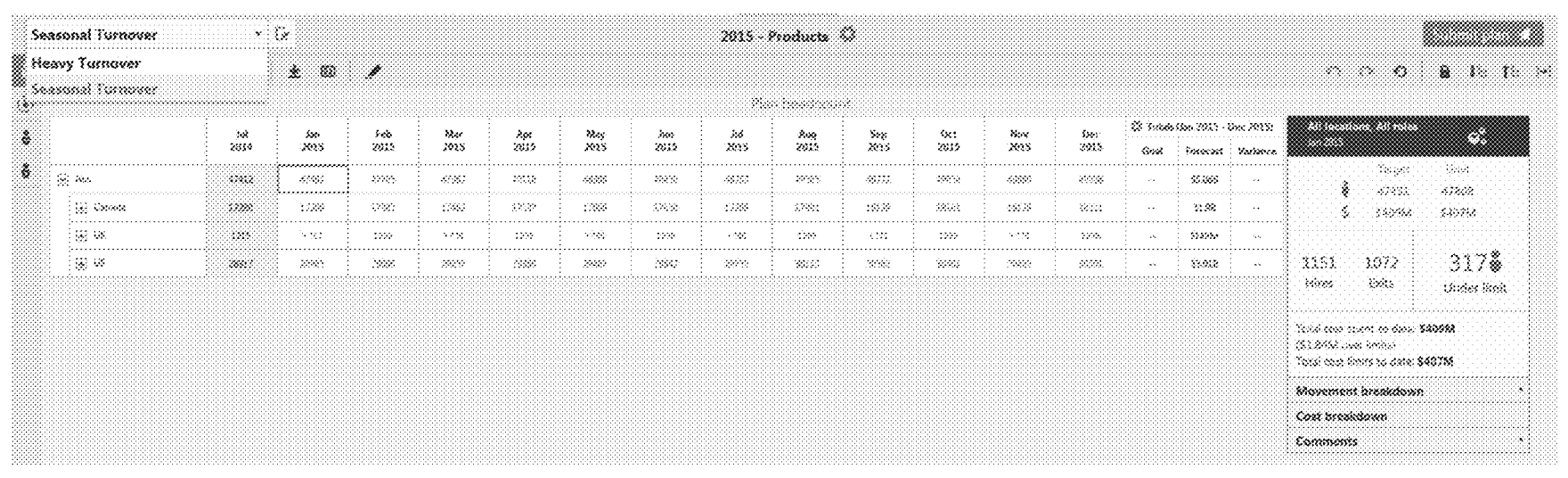
Figure 34:
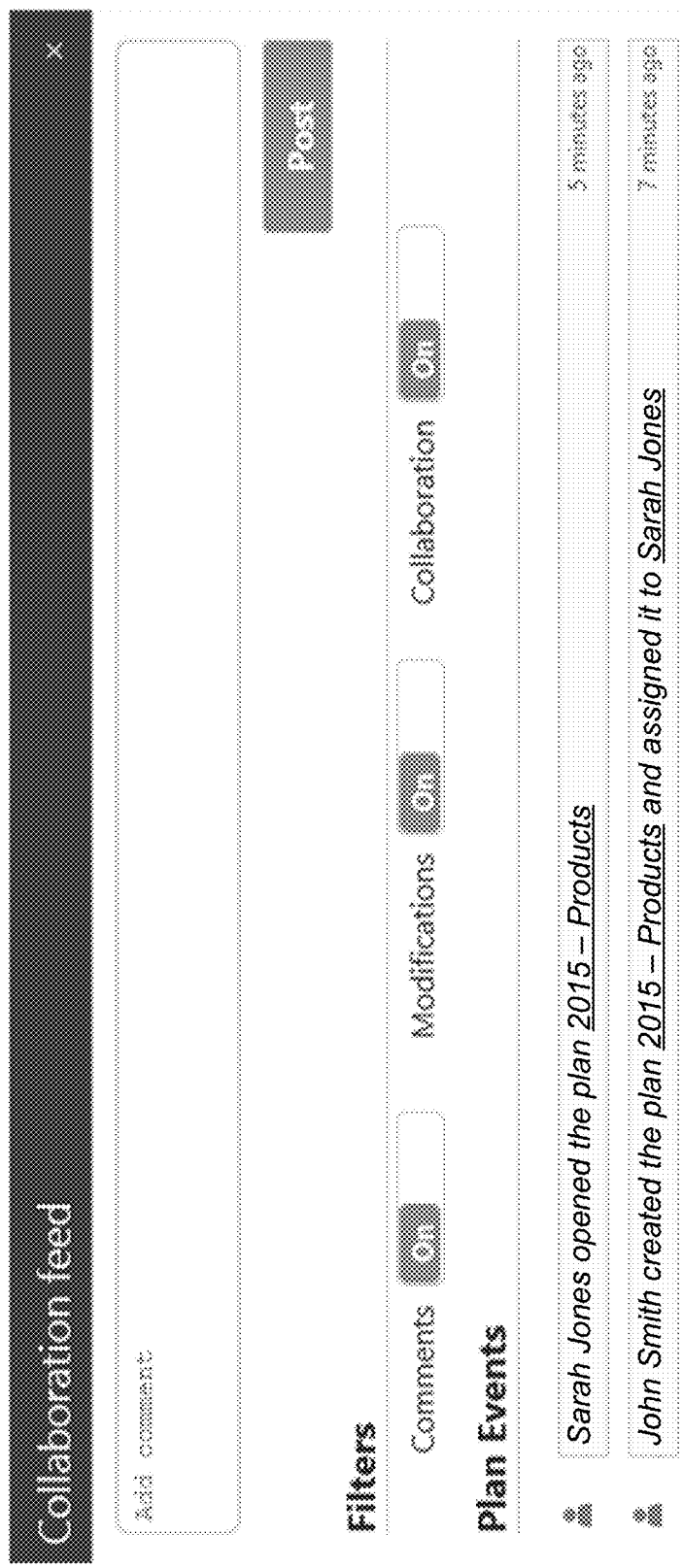

When a sub-plan 3003 is delegated to the sub-planner, the WFP application may automatically trigger a notification (e.g., e-mail message, text message, etc.) to a computing device associated with the sub-planner. When the sub-planner logs in to the WFP application, the delegated sub-plan 3003 may be available for editing. For example, as shown in FIG. 32, the "2015—Products" sub-plan is available for editing when Sarah Jones logs in to the WFP application. FIG. 33 illustrates the "2015—Products" sub-plan after it is opened for editing by Sarah Jones. FIG. 34 illustrates a collaboration feed for the sub-plan, which may be displayed in response to selection of the collaboration feed button 507 of FIG. 5. The collaboration feed may list plan events (e.g., plan creation, assignment, submission, acceptance, rejection, etc.). The collaboration feed may also track modifications and provide commenting ability on individual cells. The collaboration feed may thus provide redlining functionality in the WFP application.

Figure 35:
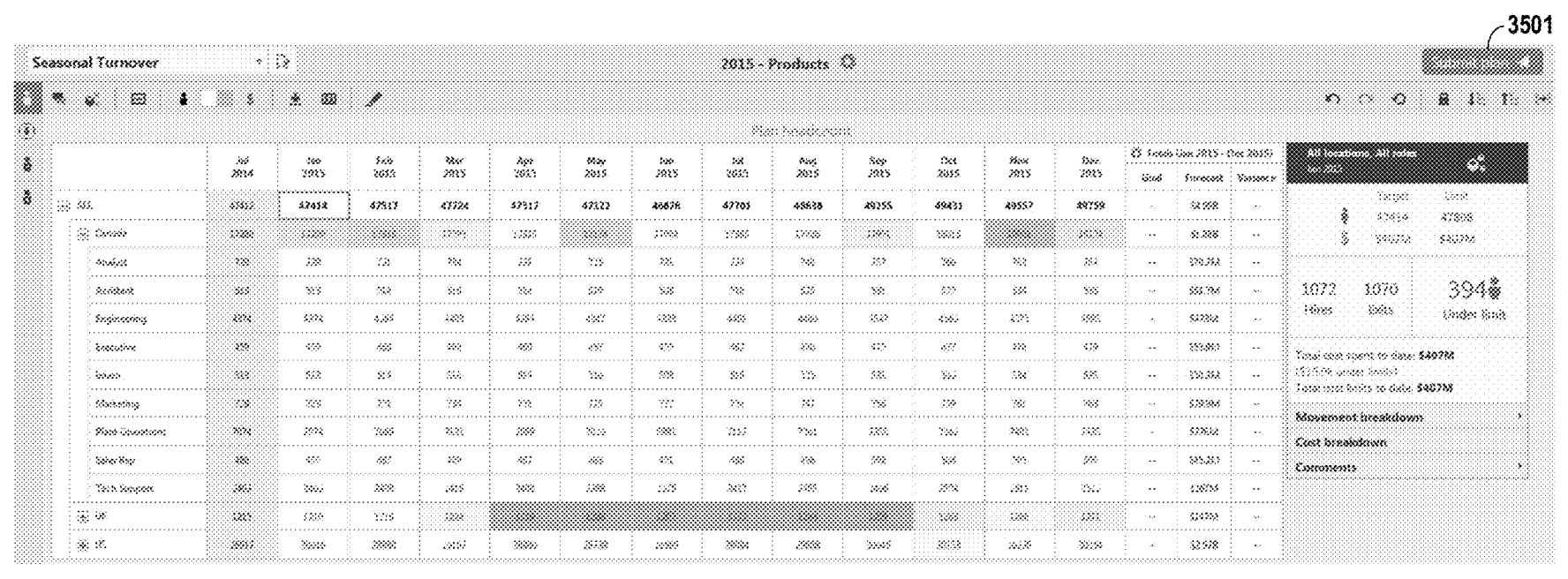

The sub-planner may edit 3004 the sub-plan 3003 and, when the sub-planner feels that the sub-plan 3003 is complete, the sub-planner may submit 3005 the sub-plan 3003. For example, FIG. 35 illustrates the sub-plan after Sarah Jones performs top-level a fit to cost limit operation in both scenarios, and FIG. 36 illustrates a submission dialog box that is displayed when Sarah Jones selects a submit plan button 3501. When the sub-plan 3003 is submitted, the WFP application may automatically trigger a notification to a computing device associated with the owner of the parent plan 3001.

When the owner of the parent plan 3001 logs in and selects the submitted sub-plan 3003, the WFP application may trigger a merge workflow to assist the owner of the parent plan 3001 in evaluating the values of the sub-plan 3003. FIG. 37 illustrates an example in which the submitted "Products —2015" sub-plan is available for review by John Smith. FIG. 37 also shows the list of turnover assumptions that have been defined by John Smith, including the "ss resignation rate" assumption defined in FIG. 3, the assumptions from the "Heavy Turnover" scenario of the "2015" plan, and the assumptions of the "Seasonal Turnover" scenario of the "2015" plan.

Figure 38:
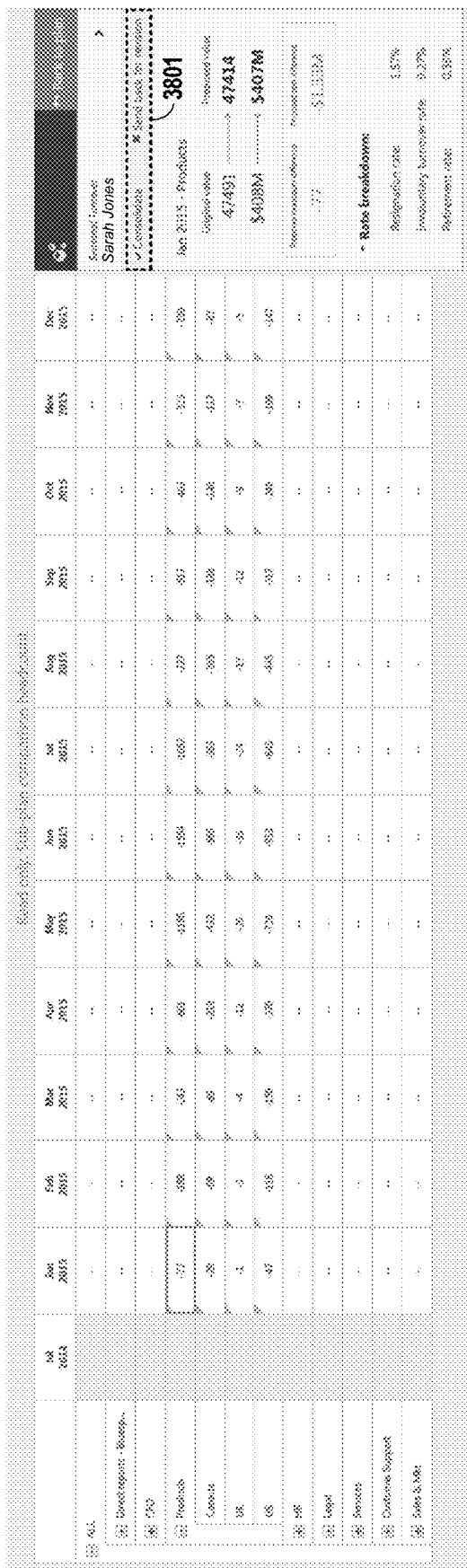

In the merge workflow, the WFP application may display a deviance view of a headcounts, costs, and turnover values of the sub-plan 3003 in the planning grid of the parent plan 3001, so that the owner of the parent plan 3001 can evaluate whether the values of the sub-plan 3003 are satisfactory. For example, FIG. 38 illustrates such a view for the "Seasonal Turnover" scenario of the "Products—2015" sub-plan, including options to consolidate (e.g., accept/merge) or reject the sub-plan and send the sub-plan back for revision, at 3801.

Figure 39:
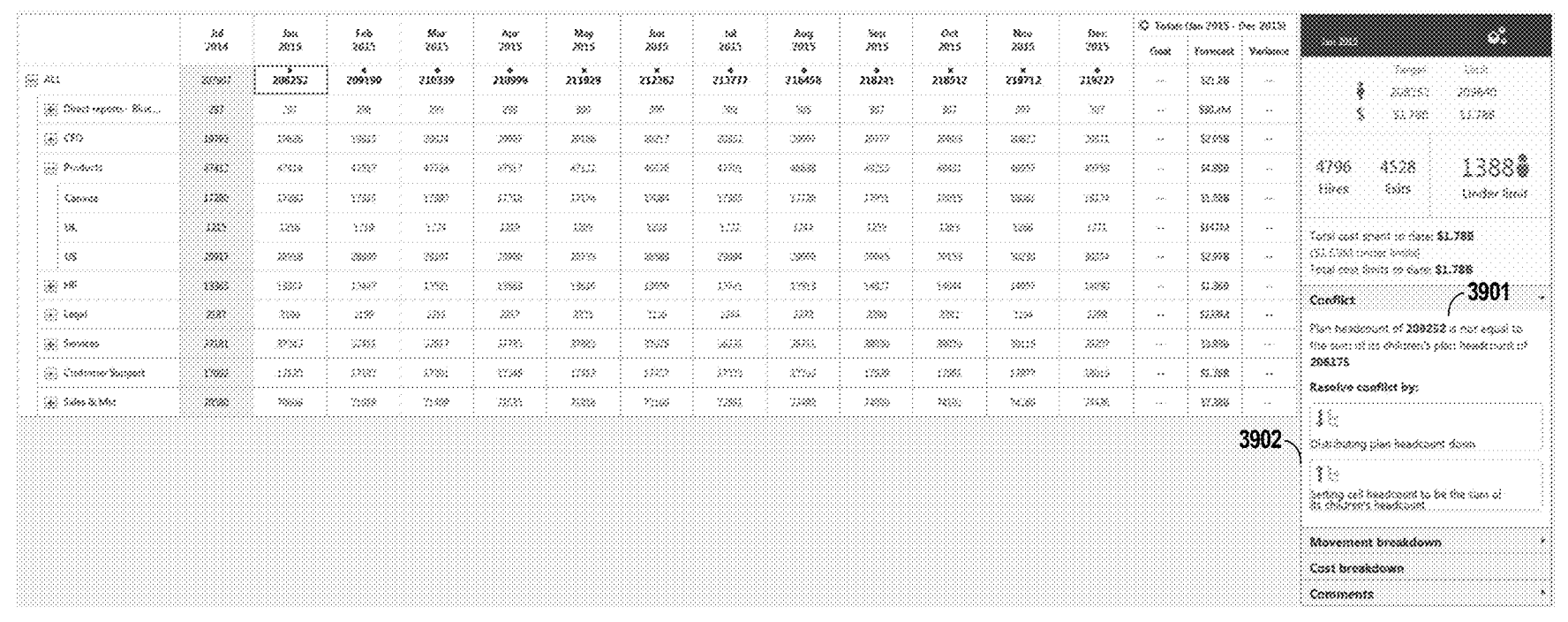

If the values of the sub-plan 3003 are satisfactory, the owner of the parent plan 3001 may accept 3006 the sub-plan. Once the sub-plan 3003 is accepted, the values of the sub-plan 3003 may overwrite the corresponding values of the parent plan 3001, the changes may be aggregated up in the parent plan 3001, and the sub-plan 3003 may be closed. For example, FIG. 39 illustrates the "2015" parent plan after the merger of the "Products—2015" sub-plan. The WFP application automatically detects conflicts in the top-level rows of the plan, as shown at 3901, because the top level headcount in each column is no longer equal to the sum of the corresponding child rows. As shown at 3902 and as described above with reference to FIG. 29, such conflicts can be resolved by distributing down to child rows or by setting the parent row to the sum of the child rows.

To restart the collaboration workflow, the sub-plan 3003 can be reopened 3007 (e.g., by the sub-planner and/or or the owner of the parent plan 3001). If the values of the sub-plan 3003 are not found to be satisfactory, the owner of the parent plan 3001 may reject 3008 the sub-plan 3003. The sub-planner may be provided comments regarding the reasons for rejection, and the sub-planner may re-edit 3004 the sub-plan 3003 based on the comments.

When the plan 3001 is complete, the owner of the plan 3001 may "publish" the plan 3001. Publishing the plan may include selecting a single scenario of the plan as an "active" scenario, and the data of the active scenario may be made available for viewing, monitoring, and further analysis. A published plan can be reopened and modified, including performing additional collaborative planning process, in the event that reality deviates from the forecasted future (as described further herein with respect to FIGS. 19-21). The modified plan can then be re-published.

FIGS. 31-39 thus illustrate exemplary WFP GUIs that can be used in conjunction with collaborative workflows, which may help dividing the planning workload amongst multiple users. It will be appreciated that such collaborative processes difficult to implement using conventional WFP tools, such as a spreadsheet. For example, only one user may be able to edit the spreadsheet at a time and it may be difficult to evaluate changes between different versions of the spreadsheet.

Figure 40:
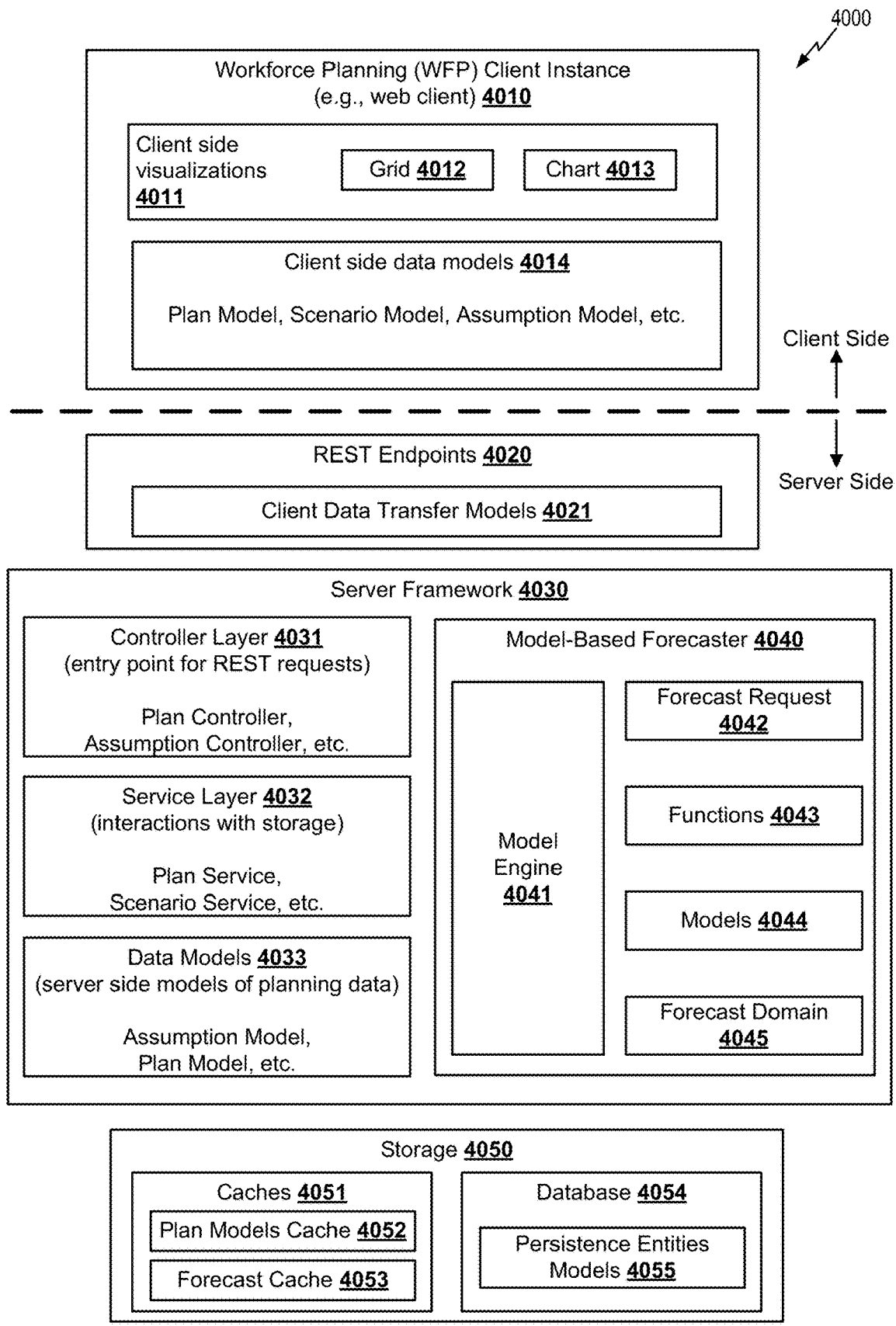
FIG. 40 illustrates another particular embodiment of a system that is operable to perform workforce planning.

FIG. 40 is an architectural diagram to illustrate an embodiment of the WFP platform described with reference to FIG. 1, and is generally designated 4000. FIG. 40 illustrates four architectural components: a WFP client instance (e.g., web client) 4010, REST endpoints 4020, a server framework 4030, and storage 4050. In a particular embodiment, each of the components corresponds to hardware and/or software (e.g., processor executable instructions) configured to perform one or more of the operations described above with reference to FIGS. 1-35 and described below.

In an illustrative example, the WFP client instance 4010 corresponds to one of the client instances 112 or 122 of FIG. 1. The WFP client instance 4010 may include client side visualizations 4011 that are used to render data (e.g., GUI data) received from the server framework 4030. For example, the client side visualizations may include a grid visualization 4012 and/or a chart visualization 4013. The grid visualization 4012 may be used to display a two-dimensional array of cells, where a first (e.g., horizontal) axis of the array corresponds to time and a second (e.g., vertical) other axis of the array corresponds to a dimension. The chart visualization 4013 may be used to render bar charts, pie charts, line (trend) charts, etc. based data included in the plan.

The WFP client instance 4010 may also include client side data models 4014, such as a plan model, a scenario model, an assumption model, etc. The client side data models 4014 may indicate how data associated with a plan is organized and represented. For example, a plan model may indicate how historical/forecasted values in the plan (e.g., the headcount values displayed in the grid visualization 4012) are organized and represented, such as the ordering and headings of each row and column in a planning grid. A scenario model may indicate how data regarding scenarios defined by a user (or generated by default) is represented, and an assumption model may indicate how data regarding assumptions defined by a user (or generated by default) is represented. As used herein, a "scenario" may correspond to a set of "assumptions" that are applied to the plan, where each assumption is an estimation of values that relate to headcount in the plan. Each scenario may represent a set of forecasted values within data models stored at a server (e.g., the WFP engine 130). In a particular embodiment, headcounts, assumption models, and limits may be created and/or stored on a per-scenario basis. A plan may include one scenario or more than one scenario.

To illustrate, a user may define assumptions regarding how employment cost (e.g., base pay, bonus, benefits, etc.) and turnover (e.g., resignation rate, involuntary turnover rate, retirement rate, etc.) will vary in the future. Different sets of assumptions may be clustered together in a scenario. For example, an "economic recession" scenario may include assumptions indicating decreases in bonuses and resignation rate. As another example, an "early retirement" scenario may include an assumption that retirement rate will increase. Different scenarios may be defined and compared within the same plan, as described above with reference to FIG. 21. Moreover, assumptions may be defined independently of plans and may be imported into different scenarios in different plans. The described WFP framework may thus separate assumptions (e.g., mathematical models) from the raw forecasting data generated from the assumptions, which may enable users to more quickly create and update different plans for different business needs. For example, the described WFP framework may be preferable to a spreadsheet in which mathematical logic is hardcoded in form of formulae and/or macros, and therefore difficult to export to other planning spreadsheets.

The REST endpoints 4020 may be used by the WFP client instance 4010 to communicate with the server framework 4030. For example, when a user at the WFP client instance 4010 edits a scenario, a client side scenario model may be updated and the update may be communicated to the server framework 4030 using a REST endpoint that is relevant to editing scenarios. To illustrate, a user may edit a scenario to use "Assumption 2" instead of "Assumption 1." This edit may generate a hypertext transfer protocol (HTTP) POST request to a scenario edit REST endpoint, where the POST request includes data indicating the replacement of "Assumption 1" with "Assumption 2." The data in the POST request may be converted to server-side data (e.g., using a server-side scenario model), and the converted data may be passed to the server framework 4030. In a particular embodiment, client data transfer models 4021 may be used to define the types of data that can be exchanged between the WFP client instance 4010 and the server framework 4030. For example, the client data transfer models 4021 may be used to serialize data into a JAVASCRIPT programming language object notation (JSON) format or other serialized format prior to transmission of the serialized data.

In a particular embodiment, WFP data may be stored as numeric values and two data structures may be used for storage: a compact cell data structure and a compact cell structure. The compact cell data structure may be a JSON object storing the raw data values for a plan. The data may be stored in a two-dimensional array. Multiple compact cell data structures may exist for a plan. The compact cell structure may be a JSON object storing the structural information (e.g., organization) of the plan data. Because each of the compact cell data structures for the plan is organized the same way, the compact cell structure may be stored once per plan.

The server framework 4030 may include a controller layer 4031, a service layer 4032, data models 4033, and a model-based forecaster 4040. The REST endpoints 4020 call into the controller layer 4031 in response to receiving requests from the WFP client instance 4010. In a particular embodiment, the controller layer 4031 includes a plan controller that is invoked in response to plan actions (e.g., creating a plan), an assumption controller that is invoked in response to assumption actions (e.g., modifying or saving an assumption), etc. To save data (e.g., to the storage 4050), the controller layer 4031 may utilize the service layer 4032, which may include services (e.g., a plan service, a scenario service, etc.) configured to retrieve data from the storage 4050, perform computations on the data using the data models 4033, and/or persist data to the storage 4050. The data models 4033 may be server side models of planning data, and may include an assumption model, a plan model, etc. It should be noted that the server side data models 4033, the client data transfer models 4021, and the client side data models 4014 may not include "raw" plan data (e.g., headcount numbers). The raw data may be stored in the storage 4050, as further described herein, and the model 4033, 4021, and 4014 may include metadata regarding the organization of the raw data and helper functions that are used to manipulate the raw data (e.g., a multidimensional cube or other in-memory data structure populated with the raw data) and perform calculations.

The model-based forecaster 4040 includes a model engine 4041 configured to perform computations to generate forecasted data values for different scenarios of a plan. In a particular embodiment, the model-based forecaster 4040 may service a forecast request 4042 by chaining the execution of models 4044, where each model 4044 defines high-level functionality that is based on a sequence of lower-level functions 4043 and variables. A model 4044 may define "hard" dependencies that must be met for model execution and/or "soft" dependencies that are optional for model execution. Execution of a model by the model engine 4041 may include applying the functions 4043 to transform input data values into a result that is the output measure of the model. In a particular embodiment, the forecast request 4042 defines models in a valid execution ordering, and may also define the measures that are to be output by the model engine 4041. The model engine 4041 may reduce the list of available models to a minimal list of models required to service the request prior to beginning forecasting operations.

To illustrate, the forecast request 4042 identify a time range, values to forecast, etc. The model engine 4041 may select one or more particular forecasting models 4044 to use to service the forecast request 4042. For example, the forecasting model used to project cost of employee hiring may be different from the forecasting model used to project employee exits based on resignation, retirement, and involuntary turnover. Each of the forecasting models 4044 may utilize commonly-defined lower-level functions 4043, such as summation, division, etc. The functions 4043 may thus represent basic building blocks for the models 4044.

The forecast domain 4045 may represent "helper" storage used by the model engine 4041, such as to store intermediate computation values. The forecast domain 4045 may also store measure definitions and lists of measures having common properties (e.g., a list of measures that can be rolled up, a list of turnover-related measures, etc.). The forecast domain 4045 may further store metadata regarding measures, such as name, type, default value, default value function, roll-up scheme, etc. As an illustrative non-limiting example, an involuntary turnover measure may have the name "wfp_involuntary_turnover," the type "Exit," the default value 0, and an "additive" roll-up scheme.

In a particular embodiment, the model-based forecaster 4040 includes or has access to a model cache, a measure store, and a measure cube (not shown). The model cache may be a private storage space created for execution of a model, and may be used to store temporary results that may be used by a model but need not be persisted to a more permanent data store. The measure store and measure cube may be storage spaces for forecast results. For example, the measure store may include metadata and the measure cube may store raw data values on a cell-by-cell basis.

The storage 4050 may include caches 4051 and a database 4054, such as a relational database. The caches 4051 include a plan models cache 4052 and a forecast cache 4053. When plan data or forecasting data is retrieved from the database 4054 and provided to the server framework 4030, the data may be stored in the caches 4052 or 4053, so that the data can be retrieved more quickly in response to a subsequent request for the data. Similarly, modified plan or forecasting data may be stored in the caches 4052 or 4053 prior to being persisted in the database 4054. The organization the database 4054 (e.g., relational database table structures) is represented in FIG. 40 by persistence model entities 4055. In some embodiments, data in the caches 4051, data in the forecast domain 4045, and/or other data being operated on by the server framework 4030 may be stored in in-memory data storage. For example, the in-memory data storage can be considered a "base" hypercube that includes a (e.g., large) number of available dimensions, where each dimension can include a large number of members. In an exemplary embodiment, the base cube is an N-dimensional online analytical processing (OLAP) cube.

An illustrative non-limiting example of a forecasting operation that can be performed by the model-based forecaster 4040 is forecasting the number of employees that will resign in a particular (future) month of a plan. The model engine 4041 may retrieve a forecasting model 4044 for resignation rate, which may indicate that the number of resignations is equal to the number of employees in the preceding month of the plan multiplied by the assumed resignation rate for the month in question. Responsive to the forecasting model 4044, the model engine 4041 may determine the number of employees in the preceding month and the assumed resignation rate from the month in question. For example, such data may be retrieved from the storage 4050. The model engine 4041 may then call into one or more of the functions 4043 to determine the product of the number of employees and the assumed resignation rate.

In a particular embodiment, the server framework 4030 performs security functions. For example, the server framework 4030 may store security data that is used plan security. In a particular embodiment, to implement plan security, certain plan components or actions may be bound to specific security levels or enterprise roles. For example, a top organizational level of a workforce plan may be bound to a high security level, to an "Executive" or "Director" role, etc. When a user attempts to view a portion of a plan or perform a specific action, the server framework may determine whether the meets the needed security level or enterprise role. If not, the server framework may return an error message to the requesting WFP client instance 4010.

In some examples, organizational security may be applied on the basis of the organization(s) that a user has access to. For example, a planner in a "Products" organization may have access to products-related planning, but may not have access to plan information for a "Legal" organization. The security data maintained by the server framework 4030 may indicate that a user has access to planning information for the user's organization and organizations descending from the user's organization.

FIG. 40 thus illustrates a system architecture that is operable to support a WFP framework/application. It should be noted, however, that in alternative embodiments different hardware and/or software components may be used as part of the WFP framework/application.

Figure 41:
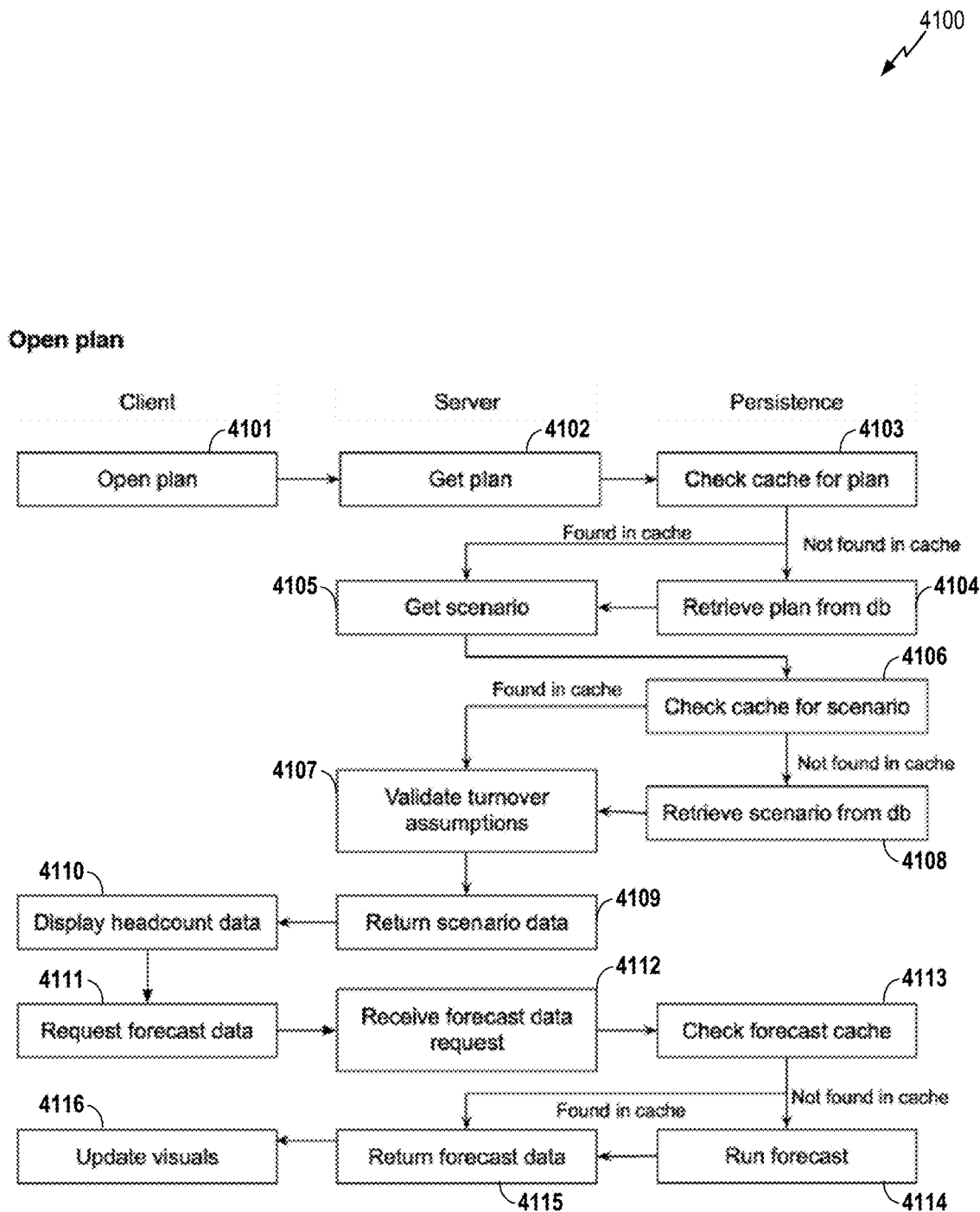
FIG. 41 illustrates a particular method of operation at a workforce planning application.

FIG. 41 illustrates a particular embodiment of a method 4100 of operation when a plan is opened. The method 4100 includes operations performed by a client (e.g., the client instance 112, 122, or 4010), operations performed by a server (e.g., the WFP engine 130 or the server framework 4030), and operations performed at or based on persistent storage (e.g., the client data 133 or the storage 4050).

At 4101, the client may request to open a specific plan. At 4102, the server may attempt to retrieve the plan e.g., data corresponding to the plan). Initially, at 4103, a cache (e.g., the caches 4051) may be examined to check if the requested plan is cached. If the requested plan is found in the cache, the method 4100 advances to 4105, where the server attempts to retrieve data for a default or user-defined scenario of the plan. If the requested plan is not found in the cache, the requested plan is retrieved from a database (e.g., the database 4054), at 4104.

Continuing to 4106, the server may check whether the requested scenario is cached. If so, the method advances to 4107. If not, the scenario data is retrieved from the database, at 4108. The server may then validate turnover assumptions, at 4107, and return scenario data to the client, at 4109. As an illustrative non-limiting example, validating a turnover assumption may include verifying that the dimensions and the time span of turnover assumption are compatible with the dimensions and the time span of the plan. At 4110, the client may display headcount data. For example, the headcount data may be displayed in a grid visualization, as described with reference to FIG. 5.

At 4111, the client may generate a request for forecast data (e.g., a request for the model-based forecaster 4040 to perform a specified forecasting operation). The server may receive the forecast data request, at 4112, and check a forecast cache (e.g., the forecast cache 4053) for the requested forecast data, at 4113. If the forecast data is not cached, the forecasting operation may be executed, at 4114, and the resulting forecasting data may be stored in the forecast cache for subsequent retrieval. If the requested forecast data is cached, the server may retrieve the cached forecast data, at 4115, without running the forecast operation. Continuing to 4116, the client may update one or more visualizations based on the received forecast data.

Figure 42:
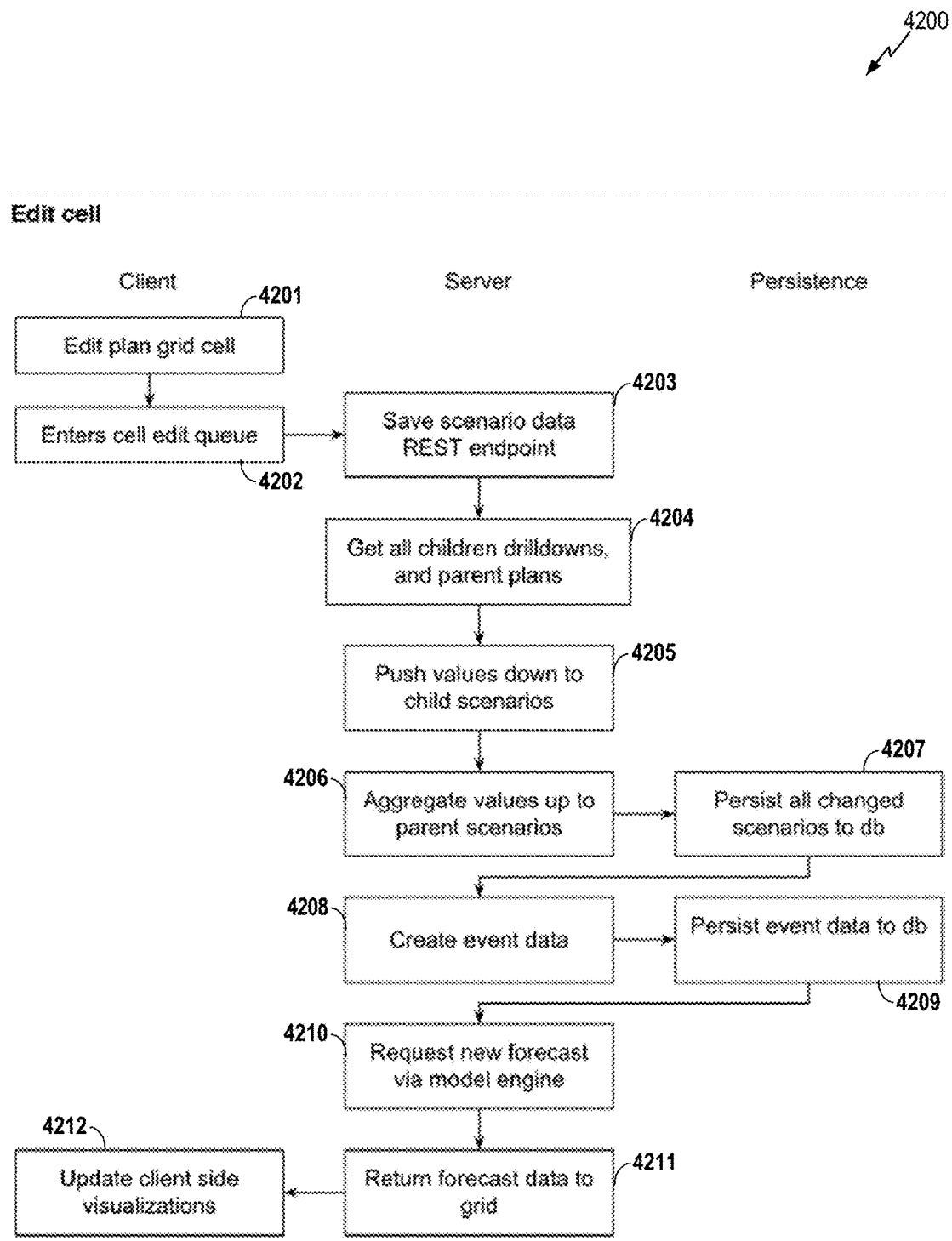
FIG. 42 illustrates another particular method of operation at a workforce planning application.

FIG. 42 illustrates a particular embodiment of a method 4200 of operation when a cell of a plan is edited. The method 4200 includes operations performed by a client (e.g., the client instance 112, 122, or 4010), operations performed by a server (e.g., the WFP engine 130 or the server framework 4030), and operations performed at or based on persistent storage (e.g., the client data 133 or the storage 4050).

At 4201, the client may receive user input that edits the value in a cell of a plan. Alternatively, the cell may be edited based on a previous planning operation, such as a fitting operation, a freeze hiring operation, etc. The client may insert the cell in an edit queue, at 4202. The client may notify the server regarding editing operations for cells in the edit queue when the client and/or server is idle, one-cell-at-a-time, in batched requests corresponding to multiple cells, in some other fashion, or any combination thereof. In a particular embodiment, to avoid issuing a request each time a cell is edited, the client may store edits that occur during a particular time period and may send an aggregate list of the edits at the end of the time period.

Advancing to 4203, the server may detect entry into a "save scenario data" REST endpoint. The server may retrieve all child "drilldowns" and parent plans, at 4204, and push values down to child scenarios, at 4205. Within a plan, for row positions that end in a member of multi-level dimension, the WFP application may allow the user to "drilldown" to expand members of a selected row to the next level of the multi-level dimension. For example, a "Canada" row may be expanded into "Toronto," "Vancouver," and "Calgary" rows. When a user drills down on a row, the WFP application may create a child plan object. Edits to the child plan object can be aggregated to the top level plan of the drill down hierarchy, and edits to the plan can be distributed to all child drill down plans.

The server may aggregate values up to parent scenarios, at 4206. Changed scenarios may be stored in a database (e.g., the database 4054), at 4207, and the server may create event data describing the scenario edits, at 4208. The event data for a plan/scenario may thus provide an ordered list of actions (e.g., editing actions) that have been applied to the plan/scenario. The event data may be stored in the database, at 4209, and the server may request a new forecast via a model engine, at 4210. For example, due to the change in one or more cells of the plan, new forecasts may be run by the model-based forecaster 4040. The server may return the forecast data to the grid visualization (i.e., the client), at 4211, and the client may update the grid based on the forecast data, at 4212.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-42. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in one or more computer-readable or a processor-readable devices, such as a centralized or distributed database, and/or associated caches and servers. The terms "computer-readable device" and "processor-readable device" also include device(s) capable of storing instructions for execution by a processor or causing a computer system to perform any one or more of the methods or operations disclosed herein. Examples of such devices include, but are not limited to, random access memory (RAM), flash memory, read-only memory (ROM), programmable read-only memory (PROM), erasable programmable read-only memory (EPROM), electrically erasable programmable read-only memory (EEPROM), register-based memory, solid-state memory, a hard disk, a removable disk, a disc-based memory (e.g., compact disc read-only memory (CD-ROM)), or any other form of storage device. A computer-readable or processor-readable device is not a signal.

In a particular embodiment, a method includes receiving, at a computing device including a processor, input identifying a dimensional framework and a forecasting time period. The method also includes generating a workforce plan based on the dimensional framework and the forecasting time period. The method further includes receiving first data defining a first scenario of the workforce plan, where the first scenario is associated with at least a first turnover assumption, and determining a first set of forecasted headcount values corresponding to the first scenario. The method includes receiving second data defining a second scenario of the workforce plan, where the second scenario is associated with at least a second turnover assumption that differs from the first turnover assumption, and determining a second set of forecasted headcount values corresponding to the second scenario. The method also includes generating graphical user interface (GUI) data that includes a comparison of the first set of forecasted headcount values and the second set of forecasted headcount values.

In another particular embodiment, a computer-readable storage device stores instructions that, when executed by a processor, cause the processor to perform operations including receiving input identifying a dimensional framework and a forecasting time period. The operations also include generating a workforce plan based on the dimensional framework and the forecasting time period. The operations further include receiving first data defining a first scenario of the workforce plan, where the first scenario is associated with at least a first turnover assumption, and determining a first set of forecasted headcount values corresponding to the first scenario. The operations include receiving second data defining a second scenario of the workforce plan, where the second scenario is associated with at least a second turnover assumption that differs from the first turnover assumption, and determining a second set of forecasted headcount values corresponding to the second scenario. The operations also include generating GUI data that includes a comparison of the first set of forecasted headcount values and the second set of forecasted headcount values.

In another particular embodiment, an apparatus includes a processor and a memory storing instructions that, when executed by a processor, cause the processor to perform operations including receiving input identifying a dimensional framework and a forecasting time period. The operations also include generating a workforce plan based on the dimensional framework and the forecasting time period. The operations further include receiving first data defining a first scenario of the workforce plan, where the first scenario is associated with at least a first turnover assumption, and determining a first set of forecasted headcount values corresponding to the first scenario. The operations include receiving second data defining a second scenario of the workforce plan, where the second scenario is associated with at least a second turnover assumption that differs from the first turnover assumption, and determining a second set of forecasted headcount values corresponding to the second scenario. The operations also include generating GUI data that includes a comparison of the first set of forecasted headcount values and the second set of forecasted headcount values.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method of manipulating and rearranging presentation of workforce data in accordance with different data-prediction scenarios available within a graphical user interface (GUI) of a computer system, the method comprising:

causing display, within the GUI, of (i) a data-presentation region in which respective workplace planning data in accordance with a respective data-prediction scenario of a plurality of different data-prediction scenarios is presented and (ii) a data-modification region that includes a first user interface object for selecting one or more data-prediction scenarios of the plurality of different data-prediction scenarios and a second user interface object for analyzing respective workforce planning data from two or more of the plurality of different data-prediction scenarios;

receiving, via the GUI and from within the data-modification region, information indicating a selection of a first data-prediction scenario of the plurality of different data-prediction scenarios via the first user interface object included within the data-modification region, the first data-prediction scenario associated with a forecasting time period and a workforce resource dataset; and in response to receiving the information indicating the selection of the first data-prediction scenario of the plurality of different data-prediction scenarios:

causing display, within the data-presentation region of the GUI, of first forecasted headcount data of the first data-prediction scenario, the first forecasted headcount data being based on:

the workforce resource dataset, wherein the workforce resource dataset is a multidimensional online analytical processing (OLAP) base cube dataset comprising a plurality of dimensions, wherein a respective dimension in the plurality of dimensions comprises a plurality of dimension members each having an identifier and a numerical component that includes employee headcount data for an organization, wherein a dimensional hierarchy is defined for data in the workforce resource dataset, a calculated first employee turnover rate that is based on historical turnover of the organization, and a generated headcount forecasting model that is generated based on a dimension level of the identifier;

after causing display of the first forecasted headcount data of the first data-prediction scenario within the data-presentation region of the GUI and after receiving an indication that the second user interface object included within the data-modification region has been selected to analyze the first data-prediction scenario as compared to a second data-prediction scenario of the plurality of different data-prediction scenarios:

causing display, within the data-presentation region of the GUI, of second forecasted headcount data of the second data-prediction scenario different from the first data-prediction scenario, the second forecasted headcount data being based on:

the workforce resource dataset;

a calculated second employee turnover rate for the organization that differs from the calculated first employee turnover rate; and the generated headcount forecasting model; and causing display, within the data-presentation region of the GUI using a dimensional hierarchy axis and a time axis of a planning grid, of generated planning data comprising the first forecasted headcount data of the first data-prediction scenario concurrently with the second forecasted headcount data of the second data-prediction scenario over the forecasting time period.

2. The method of claim 1, wherein the calculated first employee turnover rate, the calculated second employee turnover rate, or both include at least one of an employee resignation rate, an employee termination rate, or an employee retirement rate, wherein the organization includes a business enterprise, and wherein the workforce resource dataset comprises a workforce plan of the business enterprise.

3. The method of claim 1, wherein the first data-prediction scenario and the second data-prediction scenario are each associated with a headcount cost assumption and a headcount turnover assumption, which are applied by the computer system to set limits required to be met for each of the first data-prediction scenario and the second data-prediction scenario to be designated as viable.

4. The method of claim 3, wherein the headcount cost assumption is associated with an existing workforce cost or a new hire cost, and wherein the generated planning data includes a comparison of the first forecasted headcount data and the second forecasted headcount data.

5. The method of claim 4, wherein the headcount cost assumption is associated with base pay, bonus, contingent workforce, employment insurance, taxes, health benefits, long term incentive, pay for time not worked, supplemental pay, workforce allocations, or any combination thereof.

6. The method of claim 3, wherein the headcount cost assumption is associated with a hiring event cost, and wherein the hiring event cost comprises an agency cost, a referral cost, a relocation cost, or any combination thereof.

7. The method of claim 1, wherein the generated headcount forecasting model for the organization is based at least in part on historical headcounts.

8. The method of claim 1, wherein the generated headcount forecasting model comprises a steady state model, a trailing twelve month model, a year-on-year average model, a seasonal model, a regression model, or a user-input custom model.

9. The method of claim 1, wherein the data-presentation region of the GUI comprises a grid that includes a plurality of cells, wherein each row of cells in the grid corresponds to a particular dimension or dimension level of the workforce resource dataset, and wherein each column of cells in the grid corresponds to a respective portion of the forecasting time period.

10. The method of claim 9, wherein causing display of the first forecasted headcount data within the data-presentation region of the graphical user interface includes using a workforce resource plan limit for one or more cells of the grid, wherein the workforce resource plan limit comprises a headcount limit or a cost limit.

11. The method of claim 10, further comprising reconciling headcount data associated with a dimension of the workforce resource dataset, and wherein reconciling the headcount data includes summing headcount values associated with each dimension level of the dimension or adjusting the headcount values of each dimension level of the dimension, wherein a sum of the headcount values matches a headcount value in a top row of a cell of the grid.

12. The method of claim 1, wherein the first forecasted headcount data is determined based on a fitting operation.

13. The method of claim 12, wherein the fitting operation includes a fit to headcount limit operation, a fit to cost limit operation, or a fit to headcount limit and cost limit operation.

14. A hardware memory storing instructions that, when executed by a processor, cause the processor to perform operations for manipulating and rearranging presentation of workforce data in accordance with different data-prediction scenarios available within a graphical user interface (GUI) of a computer system, the operations comprising:
  causing display, within the GUI, of (i) a data-presentation region in which respective workplace planning data in accordance with a respective data-prediction scenario of a plurality of different data-prediction scenarios is presented and (ii) a data-modification region that includes a first user interface object for selecting one or more data-prediction scenarios of the plurality of different data-prediction scenarios and a second user interface object for analyzing respective workforce planning data from two or more of the plurality of different data-prediction scenarios;
  receiving, via the GUI and from within the data-modification region, information indicating a selection of a first data-prediction scenario of the plurality of different data-prediction scenarios via the first user interface object included within the data-modification region, the first data-prediction scenario associated with a forecasting time period and a workforce resource dataset; and
  in response to receiving the information indicating the selection of the first data-prediction scenario of the plurality of different data-prediction scenarios:
    causing display, within the data-presentation region of the GUI, of first forecasted headcount data of the first data-prediction scenario, the first forecasted headcount data being based on:
      the workforce resource dataset, wherein the workforce resource dataset is a multidimensional online analytical processing (OLAP) base cube dataset comprising a plurality of dimensions, wherein a respective dimension in the plurality of dimensions comprises a plurality of dimension members each having an identifier and a numerical component that includes employee headcount data for an organization, wherein a dimensional hierarchy is defined for data in the workforce resource dataset;
      a calculated first employee turnover rate that is based on historical turnover of the organization; and
      a generated headcount forecasting model that is generated based on a dimension level of the identifier;
  after causing display of the first forecasted headcount data of the first data-prediction scenario within the data-presentation region of the graphical user interface and after receiving an indication that the second user interface object included within the data-modification region has been selected to analyze the first data-prediction scenario as compared to a second data-prediction scenario of the plurality of different data-prediction scenarios:
    causing display, within the data-presentation region of the GUI, of second forecasted headcount data of the second data-prediction scenario different from the first data-prediction scenario, the second forecasted headcount data being based on:
      the workforce resource dataset;
      a calculated second employee turnover rate for the organization that differs from the calculated first employee turnover rate; and
      the generated headcount forecasting model; and
    causing display, within the data-presentation region of the GUI using a dimensional hierarchy axis and a time axis of a planning grid, of generated planning data comprising the first forecasted headcount data of the first data-prediction scenario concurrently with the second forecasted headcount data of the second data-prediction scenario over the forecasting time period.

15. The hardware memory of claim 14, wherein the operations further comprise executing a model-based forecaster to determine the first forecasted headcount data and the second forecasted headcount data.

16. An apparatus for manipulating and rearranging presentation of workforce data in accordance with different data-prediction scenarios available within a graphical user interface (GUI) of a computer system, the apparatus comprising:
 a processor; and
 a memory storing instructions that, when executed by the processor, cause the processor to perform operations comprising:
  causing display, within the GUI, of (i) a data-presentation region in which respective workplace planning data in accordance with a respective data-prediction scenario of a plurality of different data-prediction scenarios is presented and (ii) a data-modification region that includes a first user interface object for selecting one or more data-prediction scenarios of the plurality of different data-prediction scenarios and a second user interface object for analyzing respective workforce planning data from two or more of the plurality of different data-prediction scenarios;
  receiving, via the GUI and from within the data-modification region, information indicating a selection of a first data-prediction scenario of the plurality of different data-prediction scenarios via the first user interface object included within the data-modification region, the first data-prediction scenario associated with a forecasting time period and a workforce resource dataset;
  in response to receiving the information indicating the selection of the first data-prediction scenario of the plurality of different data-prediction scenarios:
   causing display, within the data-presentation region of the GUI, of first forecasted headcount data of a first data-prediction scenario, the first forecasted headcount data being based on:
    the workforce resource dataset wherein the workforce resource dataset is a multidimensional online analytical processing (OLAP) base cube dataset comprising a plurality of dimensions, wherein a respective dimension in the plurality of dimensions comprises a plurality of dimension members each having an identifier and a numerical component that includes employee headcount data for an organization, wherein a dimensional hierarchy is defined for data in the workforce resource dataset;
    a calculated first employee turnover rate that is based on historical turnover of the organization; and
    a generated headcount forecasting model that is generated based on a dimension level of the identifier;
   after causing display of the first forecasted headcount data of the first data-prediction scenario within the data-presentation region of the GUI and after receiving an indication that the second user interface object included within the data-modification region has been selected to analyze the first data- prediction scenario as compared to a second data-prediction scenario of the plurality of different data-prediction scenarios:
    causing display, within the data-presentation region of the GUI, of second forecasted headcount data of the second workforce scenario different from a first workforce scenario, the second forecasted headcount data being based on:
     the workforce resource dataset;
     a calculated second employee turnover rate for the organization that differs from the calculated first employee turnover rate; and
     the generated headcount forecasting model; and
    causing display, within the data-presentation region of the GUI using a dimensional hierarchy axis and a time axis of a planning grid, of generated planning data comprising the first forecasted headcount data of the first data-prediction scenario concurrently with the second forecasted headcount data of the second data-prediction scenario over the forecasting time period.

17. The apparatus of claim 16, wherein the information indicating the selection of the first data-prediction scenario of the plurality of different data-prediction scenarios is received via one or more representational state transfer (REST) application programming interface (API) endpoints.

18. The method of claim 1, wherein the dimensional hierarchy axis is a vertical axis of the planning grid and the time axis is a horizontal axis of the planning grid, and wherein a dimension hierarchy comprises a plurality of editable dimension members.

19. The method of claim 1, further comprising:
 receiving, an indication of a selection from within the data-modification region of the graphical user interface, the indication identifying a portion of the multidimensional OLAP base cube dataset for use with a sub-plan associated with the second data-prediction scenario;
 assigning to the sub-plan, by the computer system, one or more headcount forecasting models from a plurality of headcount forecasting models;
 triggering a notification to a computing device associated with a user that a sub-plan has been delegated to the user, wherein the user may edit aspects of the sub-plan;
 receiving a merge workflow notification that the user has submitted an edited sub-plan; and
 displaying a deviance view of headcounts, costs, and turnover values of the edited sub-plan for evaluation and consolidation with the multidimensional OLAP base cube dataset.

20. The method of claim 1, further comprising:
 improving forecasting accuracy by receiving, through a user-operable button on the GUI, defined cost assumptions and plan limits.

* * * * *